United States Patent
Eickhoff et al.

(10) Patent No.: US 11,602,712 B2
(45) Date of Patent: Mar. 14, 2023

(54) ATMOSPHERIC WATER EXTRACTION SYSTEM

(71) Applicant: Honeywell International Inc., Charlotte, NC (US)

(72) Inventors: Steven James Eickhoff, St. Louis Park, MN (US); Jeffrey Klein, Minneapolis, MN (US); Christopher Scott Larsen, Plymouth, MN (US); Gustav Errol Rustan, Stillwater, MN (US)

(73) Assignee: Honeywell International Inc., Charlotte, NC (US)

(*) Notice: Subject to any disclaimer, the term of this patent is extended or adjusted under 35 U.S.C. 154(b) by 163 days.

(21) Appl. No.: 17/196,917

(22) Filed: Mar. 9, 2021

(65) Prior Publication Data

US 2021/0283547 A1 Sep. 16, 2021

Related U.S. Application Data

(60) Provisional application No. 62/988,354, filed on Mar. 11, 2020.

(51) Int. Cl.
*B01D 53/04* (2006.01)
*B01D 53/26* (2006.01)
(Continued)

(52) U.S. Cl.
CPC ....... *B01D 53/0438* (2013.01); *B01D 5/0015* (2013.01); *B01D 5/0075* (2013.01);
(Continued)

(58) Field of Classification Search
CPC .... B01D 5/0015; B01D 5/0075; B01D 53/04; B01D 53/0438; B01D 53/0446;
(Continued)

(56) References Cited

U.S. PATENT DOCUMENTS 6,336,957 B1 * 1/2002 Tsymerman ............. E03B 3/28
95/95
7,306,654 B2 12/2007 King et al.
(Continued)

FOREIGN PATENT DOCUMENTS

CN 109056902 A 12/2018
EP 1711247 A1 10/2006
(Continued)

OTHER PUBLICATIONS

Communication pursuant to Article 94(3) EPC from counterpart European Application No. 21162183.4 dated Aug. 23, 2022, 13 pp.
(Continued)

*Primary Examiner* — Frank M Lawrence, Jr.
(74) *Attorney, Agent, or Firm* — Shumaker & Sieffert, P.A.

(57) ABSTRACT

A water sorption device includes a catalytic combustor configured to, in a desorption state, combust a hydrocarbon fuel mixture to generate heat; a thermoelectric generator configured to, in the desorption state, generate electricity from a first portion of the heat from the catalytic combustor; and an adsorber configured to in an adsorption state, adsorb water from ambient air from an environment and in the desorption state, desorb the adsorbed water as vapor using a second portion of the heat from the catalytic combustor.

20 Claims, 14 Drawing Sheets

(51) Int. Cl.
    *B01D 5/00* (2006.01)
    *B01D 53/28* (2006.01)
    *E03B 3/28* (2006.01)

(52) U.S. Cl.
    CPC ..... *B01D 53/0446* (2013.01); *B01D 53/0454* (2013.01); *B01D 53/261* (2013.01); *B01D 53/28* (2013.01); *E03B 3/28* (2013.01); *B01D 2253/204* (2013.01); *B01D 2253/308* (2013.01); *B01D 2257/80* (2013.01); *B01D 2259/40098* (2013.01); *B01D 2259/4575* (2013.01)

(58) Field of Classification Search
    CPC .. B01D 53/0454; B01D 53/261; B01D 53/28; B01D 2253/204; B01D 2253/308; B01D 2256/10; B01D 2259/40098; B01D 2259/4575; E03B 3/28
    USPC .... 95/117, 121, 123, 126; 96/121, 126, 146; 34/80, 472, 473
    See application file for complete search history.

(56) References Cited

U.S. PATENT DOCUMENTS

| | | | |
|---|---|---|---|
| 8,834,614 B2 | 9/2014 | Ball et al. | |
| 9,945,102 B2 | 4/2018 | Thielow et al. | |
| 10,683,644 B2 | 6/2020 | Kim et al. | |
| 2004/0107832 A1* | 6/2004 | Tongue | B01D 53/0462 95/96 |
| 2007/0095209 A1* | 5/2007 | Tongue | B01D 53/265 95/114 |
| 2008/0110193 A1 | 5/2008 | Jonqueres | |
| 2009/0223236 A1 | 9/2009 | Call et al. | |
| 2012/0160098 A1* | 6/2012 | Papale | B01D 53/0476 96/127 |
| 2019/0193512 A1 | 6/2019 | Wang et al. | |
| 2019/0299123 A1 | 10/2019 | Verplancke | |
| 2020/0340693 A1 | 10/2020 | Gentile et al. | |
| 2020/0346164 A1 | 11/2020 | Verplancke | |
| 2020/0384408 A1* | 12/2020 | Dekoninck | B01D 53/261 |

FOREIGN PATENT DOCUMENTS

| | | | |
|---|---|---|---|
| EP | 2594327 A1 * | 5/2013 | |
| EP | 3612290 A2 | 2/2020 | |
| WO | 2013039098 A1 | 3/2013 | |
| WO | 2019096889 A1 | 5/2019 | |
| WO | 2019137556 A1 | 7/2019 | |
| WO | 2019152962 A2 | 8/2019 | |
| WO | 2020034008 A1 | 2/2020 | |
| WO | 2020036905 A1 | 2/2020 | |

OTHER PUBLICATIONS

Kim et al., "Water harvesting from air with metal-organic frameworks powered by natural sunlight," Science, Apr. 2017, 10 pp.

Maharana et al., "Flameless Catalytic LPG Combustion and its Optimization Approach," Procedia Technology, vol. 24, Jan. 2016, pp. 689-695.

Teo et al., "Water Adsorption on Various Metal Organic Framework," IOP Conference Series: Materials Science and Engineering, vol. 272, Dec. 2017, 5 pp.

Extended Search Report from counterpart European Application No. 21162183.4, dated Aug. 12, 2021, 11 pp.

Kim et al., "Water harvesting from air with metal-organic frameworks powered by natural sunlight," Science, Apr. 13, 2017, 10 pp.

Liu et al., "Water and Metal—Organic Frameworks: From Interaction toward Utilization," Chemical Reviews, published May 15, 2020, 75 pp.

Maharana et al., "Flameless catalytic LPG combustion and its optimization approach," Procedia Technology, Elsevier, retrieved on Sep. 20, 2021, 7 pp.

Teo et al., "Water Adsorption on Various Metal Organic Framework," Chemical Review, published May 15, 2020, 6 pp.

Response to Extended Search Report dated Aug. 12, 2021, from counterpart European Application No. 21162183.4 filed Oct. 18, 2021, 3 pp.

Kim et al., "Adsorption-based atmospheric water harvesting device for arid climates," Nature Communications, Mar. 22, 2018, 15 pp.

Linear Technology, "Power Tracking 2A Battery Charger for Solar Power," LT3652, Revision E, 2010, retrieved from www.linear.com/LT3652 on Mar. 9, 2021, 26 pp.

Texas Instrument, "BQ25713 / 713B I2C Narrow VDC Buck-Boost Battery Charge Controller With System Power Monitor and Processor Hot Monitor," BQ25713, BQ25713B, Revised Feb. 2021, 90 pp.

Cui et al., "Metal-Organic Frameworks as advanced moisture sorbents for energy-efficient high temperature cooling," Scientific Reports, published online Oct. 16, 2018, 9 pp.

Response to Communication pursuant to Article 94(3) EPC dated Aug. 23, 2022, from counterpart European Application No. 21162183.4 filed Nov. 1, 2022, 16 pp.

* cited by examiner

ATMOSPHERIC WATER EXTRACTION SYSTEM

This application claims the benefit of U.S. Provisional Patent Application 62/988,354, filed 11 Mar. 2020 and entitled "ATMOSPHERIC WATER EXTRACTION SYSTEM," the entire content of which is incorporated herein by reference.

TECHNICAL FIELD

This disclosure relates to water extraction systems.

BACKGROUND

Water transport and distribution can be critical for certain activities, such as humanitarian missions, but is also typically logistically challenging and resource intensive, and in some circumstances may even lead to avoidable casualties.

SUMMARY

This disclosure describes techniques and devices for performing atmospheric water extraction (AWE). The techniques of this disclosure may, for example, be used in applications such as for potable water generation devices or environmental control systems (ECSs) for aircraft or other vehicles.

According to one example, a water extraction system includes a hydrocarbon fuel tank; a first water sorption unit and a second water sorption unit, wherein each of the first and second water sorption units comprises: a catalytic combustor configured to, in a desorption state, combust a hydrocarbon fuel mixture to generate heat; a thermoelectric generator configured to, in the desorption state, generate electricity from a first portion of the heat from the catalytic combustor; an adsorber configured to in an adsorption state, adsorb water from ambient air from an environment, and in the desorption state, desorb the adsorbed water as vapor using a second portion of the heat from the catalytic combustor; one or more condensers configured to condense vapor from the adsorber of each of the plurality of water sorption units; a pump configured to supply pressurized air to the plurality of water sorption units and the one or more condensers using the electricity from the thermoelectric generator; and a controller configured to operate the first and second water sorption units in alternating and opposite adsorption and desorption states to extract the water from the environment.

According to another example, a method for extracting water include alternatingly operating a water extraction system between a first state and a second state, wherein the first state comprises: adsorbing, by an adsorber of a first water sorption unit, a first amount of water from the environment; combusting, by a catalytic combustor of a second water sorption unit, a hydrocarbon fuel mixture to generate heat; generating, by a thermoelectric generator of the second water sorption unit, electricity from a first portion of the heat from the catalytic combustor of the second water sorption unit; desorbing, by an adsorber of the second water sorption unit, a second amount of water as vapor using a second portion of the heat from the catalytic combustor of the second water sorption unit; and condensing, by a condenser, the second amount of water from the second water sorption unit; and wherein the second state comprises: adsorbing, by the adsorber of the second water sorption unit, a third amount of water from the environment; combusting, by a catalytic combustor of the first water sorption unit, the hydrocarbon fuel mixture to generate heat; generating, by a thermoelectric generator of the first water sorption unit, electricity from a first portion of the heat from the catalytic combustor of the first water sorption unit; desorbing, by an adsorber of the first water sorption unit, the first amount of water as vapor using a second portion of the heat from the catalytic combustor of the first water sorption unit; and condensing, by the condenser, the first amount of water from the first water sorption unit.

According to another example, a water sorption device includes a catalytic combustor configured to, in a desorption state, combust a hydrocarbon fuel mixture to generate heat; a thermoelectric generator configured to, in the desorption state, generate electricity from a first portion of the heat from the catalytic combustor; and an adsorber configured, in an adsorption state, to adsorb water from ambient air from an environment; and in the desorption state, desorb the adsorbed water as vapor using a second portion of the heat from the catalytic combustor.

The details of one or more examples are set forth in the accompanying drawings and the description below. Other features, objects, and advantages will be apparent from the description, drawings, and claims.

DETAILED DESCRIPTION

Figure 1:
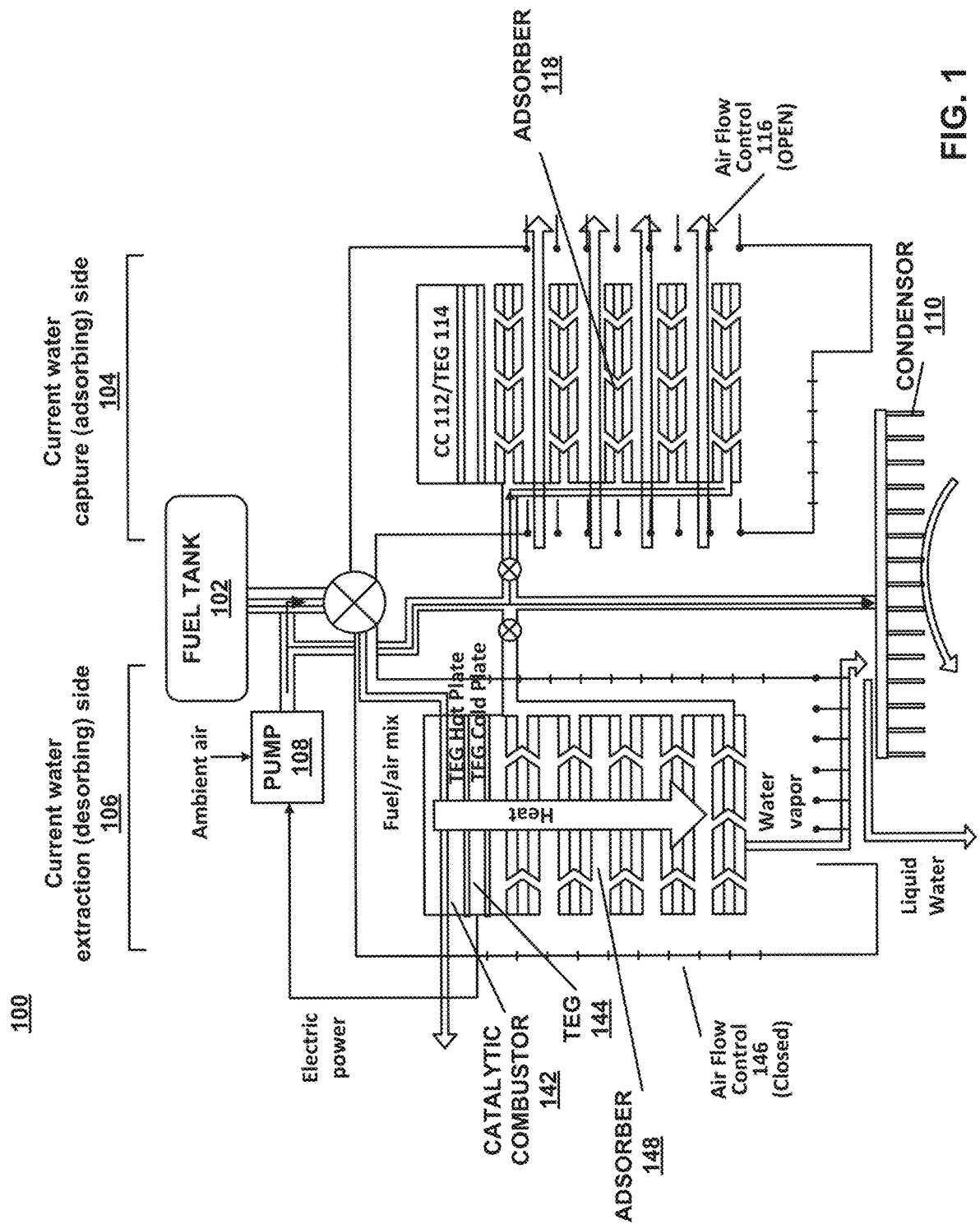
FIG. 1 shows a schematic of a system for implementing the techniques of this disclosure.

This disclosure describes techniques and devices for performing atmospheric water extraction (AWE). The techniques of this disclosure may, for example, be used in applications such as for potable water generation devices or environmental control systems (ECSs) for aircraft or other vehicles.

Existing water production technologies, such as sorbent-based dehumidifiers, have excessive size, weight, and/or power (SWaP) requirements that make them unsuitable for certain environments and circumstances, such as weight-sensitive applications. Further, ECSs that use environmental air as a heat sink are typically designed to work in relatively cool ambient conditions from which environmental air may be drawn during flight and may not be able to remove water from cabin air on the ground through condensation under hot and humid ambient conditions due to ram air systems being unavailable when a plane is not moving and due to supplemental fans generally producing poor heat exchange. Removing the water while in the vapor phase (i.e. with a sorbent) offers the potential for a reduced SWaP ECS with decreased icing risk.

This disclosure describes an improved AWE device for potable water generation for various applications. Further, the core technology (e.g., the metal organic framework (MOF)-based adsorber-heat exchanger structure and thermally-driven cycle) may also be highly relevant to aerospace ECS systems, such that the technology may reduce the SWaP of an aircraft ECS system.

This disclosure describes a device which extracts water from air for potable water generation and de-humidification applications. The techniques of this disclosure include, for example, using a high energy density heat source based on catalytic combustion of a hydrocarbon fuel (e.g. butane) to generate heat to drive water desorption of a sorbent. This catalytic combustion-based heat source may be paired with a high-efficiency (e.g., BiTe-based) thermoelectric generator (TEG), positioned between the heat source and the sorbent, to use heat from the catalytic combustion to produce electrical power for operating the device. Integration of the sorbent into a heat exchanger structure may enable rapid metal-organic framework (MOF) cycling, such that two or more sorbents may efficiently cycle between sorption and heat-driven desorption of water vapor. The heat exchanger structure may utilize high-pressure micro jets to create turbulence at a surface of the sorbent, enhancing heat and mass transfer while entraining sufficient ambient air to remove the heat of adsorption and provide sufficient mass flow to fill the sorbent with water. The sorbent may include MOF-based sorbent materials optimized for fast kinetics and high-temperature stability to enable the rapid cycling to meet challenging SWaP metrics.

Traditional vapor compression cycle dehumidification techniques may be too energy intensive, too difficult to miniaturize, and ineffective at low relative humidity (RH) to be viable solutions, such as may be found in a desert climate or resource-limited aerospace cabin. Recent advances in MOFs with micropore-sized channels have enabled water capture from low-humidity air (RH<10%) and have been integrated into rudimentary AWE systems that can generate potable water from desert air. However, demonstrated systems may be optimized for relatively narrow ranges of temperature and humidity, may require day/night ambient temperature swings, or may be too large to carry. Even a very large improvement in the water uptake characteristics of the best available MOFs (e.g., which can adsorb around 0.8 kg water/kg MOF) may not be sufficient to make use of a single day-night cycle and produce >7.5 kg of water a day from a <2.5 kg device; it may be necessary to solve the challenging energy problem of multiple daily cycles.

To harvest water over a wide range of humidity and temperature, next-generation sorbents may be developed and manufactured at scale that can simultaneously meet targets for water uptake at desired RH, high water capacity, ready water release (modest enthalpy of adsorption), fast kinetics, sorbent stability, low cost, and good manufacturability. These sorbents may be implemented in a water extraction system that may provide and manage the high energy required to adsorb, desorb, and condense large quantities of water.

This disclosure describes techniques to address these challenges. For example, this disclosure describes techniques for establishing new sorbent materials with fast kinetics, high-temperature stability, low relative humidity uptake, and minimal adsorption enthalpy, such as through the use of high-throughput computational screening based on molecular-level simulation to rapidly identify top-performing materials. The techniques of this disclosure also take advantage of high energy density hydrocarbon fuels and include converting a portion of the thermal energy to electrical energy to meet system heat exchange needs, and applying the remaining heat to the sorbent bed to provide the large amount of thermal energy needed for water desorption, in some instances using >80% of the total energy from an example energy density source. The techniques of this disclosure include integrating the sorbent into a heat exchanger which, instead of a fan, utilizes high-pressure micro jets that create surface turbulence to enhance heat and mass transfer and allow the use of pneumatic energy with greater efficiency. The techniques of this disclosure take advantage of multi-scale (lab, pilot, and production) synthesis systems established for other MOF implementations to potentially improve the production scale of potential sorbent materials.

Water extraction has been most commonly done by using a vapor compression cycle to lower the temperature of air, thereby reducing the temperature of the air below its dew point and causing condensation. This technique is intrinsically energy intensive at small scale. For example, an earlier Water Generation System (WGS) for capture from vehicle exhaust needed 14.6 kW to capture 25 L of water per day in a 16 kg device. Additionally, vapor compression-based devices may not capture water from low-RH air due to the dew point dropping below the freezing temperature of water.

Sorbent-based systems must supply sufficient heat to overcome the water adsorption enthalpy of the sorbent which, for certain sorbents such as zeolite systems, may be much greater than the enthalpy of vaporization of water. Sorbent-based systems may capture water at low relative humidity, and may have greater potential to be miniaturized. Metal organic frameworks (MOFs) with lower enthalpies approaching those of vaporization may enable low-RH water capture in portable devices.

The disclosure describes systems and techniques that may improve upon the current state-of-the art water sorbent technology (e.g., MOFs), use an energy source with high energy density and specific energy, and efficiently use energy with non-standard techniques for heat rejection and ambient air intake. The techniques of this disclosure may improve the potential of MOFs for water extraction by describing a process to design sorbent materials for particular applications. In addition or alternative to improved sorption materials, techniques of this disclosure may include processes for using nearly all of the energy in a hydrocarbon fuel by using the waste heat of a thermal-to-electrical conversion. For example, the techniques of this disclosure may achieve a thermal-to-electric conversion of 10% or greater using thermoelectric generators and improved thermal design and insulation. The techniques of this disclosure may create a useful miniature, stand-alone device for expeditionary water capture, solving major logistical challenges. For example, the disclosure describes techniques for developing a heat exchanger basis for the MOF that can move 190

W of thermal energy with only 20 W of electrical power, while providing only a 20 C temperature rise and sufficient airflow (2000 SLM) for water capture at low relative humidity in a small volume (250 cm$^3$) by using technology that incorporates micro jets in the exchanger fins.

This disclosure describes techniques that may be used to build an AWE system. A system of this disclosure may, for example, capture as much as 7.5 kg of water in a self-contained 2.5 kg, 1.5 L device. A system implementing the techniques of this disclosure may potentially capture an amount of water greater than its own mass in one day in dry conditions. Such a device may solve or alleviate major logistical water transport issues for disaster relief and other such activities and may also be extended to other applications.

FIG. 1 shows a schematic of a system for implementing the techniques of this disclosure. System 100 of FIG. 1 includes fuel tank 102, current water capture (adsorbing) side 104 ("adsorbing side 104"), current water capture (desorbing) side 106 ("desorbing side 106"), pump 108, and condenser 110. Adsorbing side 104 includes catalytic combustor 112, TEG 114, air flow control 116, and adsorber 118. Desorbing side 106 includes catalytic combustor 142, TEG 144, air flow control 146, and adsorber 148.

FIG. 1 will be described from the perspective of adsorbing side 104 being configured to perform water capture (adsorption) and desorbing side 106 being configured to perform water extraction (desorption). Adsorbing side 104 and desorbing side 106, however, may be highly structurally or operably similar, or even identical, such that each side is capable of performing both adsorption and desorption. When system 100 is running, a first side can adsorb and consume electrical power while a second side desorbs and generates electrical power for a cycle, and then during the next cycle, the second side may adsorb and consume electrical power while the first side desorbs and generates electrical power. Additionally, while only showing two sides are shown, system 100 may include more or less than two sides. As one example, system 100 may include a single side configured to cycle between adsorption and desorption. As another example, such as for environments when either adsorption or desorption may be slower or more rate-limiting than the other, system 100 may include more than two sides, such that overall adsorption and desorption processes may be more balanced.

Adsorber 118 and 148 each represent examples of adsorbers configured, in an adsorption state, to adsorb water from ambient air from an environment and in the desorption state, to desorb the adsorbed water as vapor using a second portion of the heat from the catalytic combustor. Adsorbers 118 and 148 may include one or more surfaces configured for adsorption and desorption of the water. For example, the adsorber may include structures, such as fins, that increase a surface area and provide access for ambient air to contact the one or more surfaces. In some examples, the adsorbers 118 and 148 may be configured to improve heat and/or mass transfer at the one or more surfaces of the adsorber. As will be described further below, adsorbers 118 and 148 may include fins that include a plurality of channels, and each of the plurality of channels may be configured to, in the adsorption state, receive pressurized air from a pressurized air source and discharge the pressurized air from a surface of a respective fin. Adsorbers 118 and 148 may be configured to discharge the pressurized air via small holes or "micro jets" on the surface. Adsorbers 118 and 148 may, for example, include a MOF material that includes micropores. The MOF material may include a coating on the surface of the fins, and the plurality of channels may be configured to discharge the pressurized air through the micropores of the MOF material.

System 100 may be configured to adsorb water from the atmosphere, and may enhance adsorption through forced air. At adsorbing side 104, catalytic combustor 112 and TEG 114 are off. Air flow control 116 is set to open to allow ambient air into adsorbing side 104. Pump 108 intakes the ambient air and activates adsorber 118 by providing high-pressure input air to both cool adsorber 118 and provide sufficient mass flow to fill adsorber 118 with water (water uptake). Pump 108 provides high pressure flow that is pushed through the micro jets, which entrains, e.g., pulls in from ambient, air for water adsorption.

System 100 may be configured to desorb the adsorbed water, and may utilize a high proportion of thermal heat from a high density fuel source to both drive adsorption and produce electrical power. At desorbing side 106, fuel from fuel tank 102 is mixed with ambient air and routed to catalytic combustor 142. Catalytic combustor 142 creates a controlled burn of a fuel-air mixture to generate heat. The heat is coupled to a hot plate of TEG 114 to convert the heat to DC electrical power, which is used to power electrical components of system 100, such as controllers, compressors, valves, and the like. The remaining heat passes through to a cold plate of TEG 144, which is thermally linked to adsorber 148, which operates as a passive evaporative heat sink. The heat applied to adsorber 148 supplies sufficient enthalpy of adsorption to release the water. By dividing thermal and electrical energy in this way, nearly all of the chemical energy of fuel stored in fuel tank 102 may be used. Air flow control 146 is set to closed to prevent hot, humid air from escaping desorbing side 106.

The water vapor released from adsorber 148 to condenser 110 is cooled below the dew point and condensed to liquid water. System 100 may be configured to cycle between operation of each adsorbing side 104 and desorbing side 106 for adsorption or desorption. In this way, system 100 may be configured to efficiently extract water from relatively dry environments.

Figure 2:
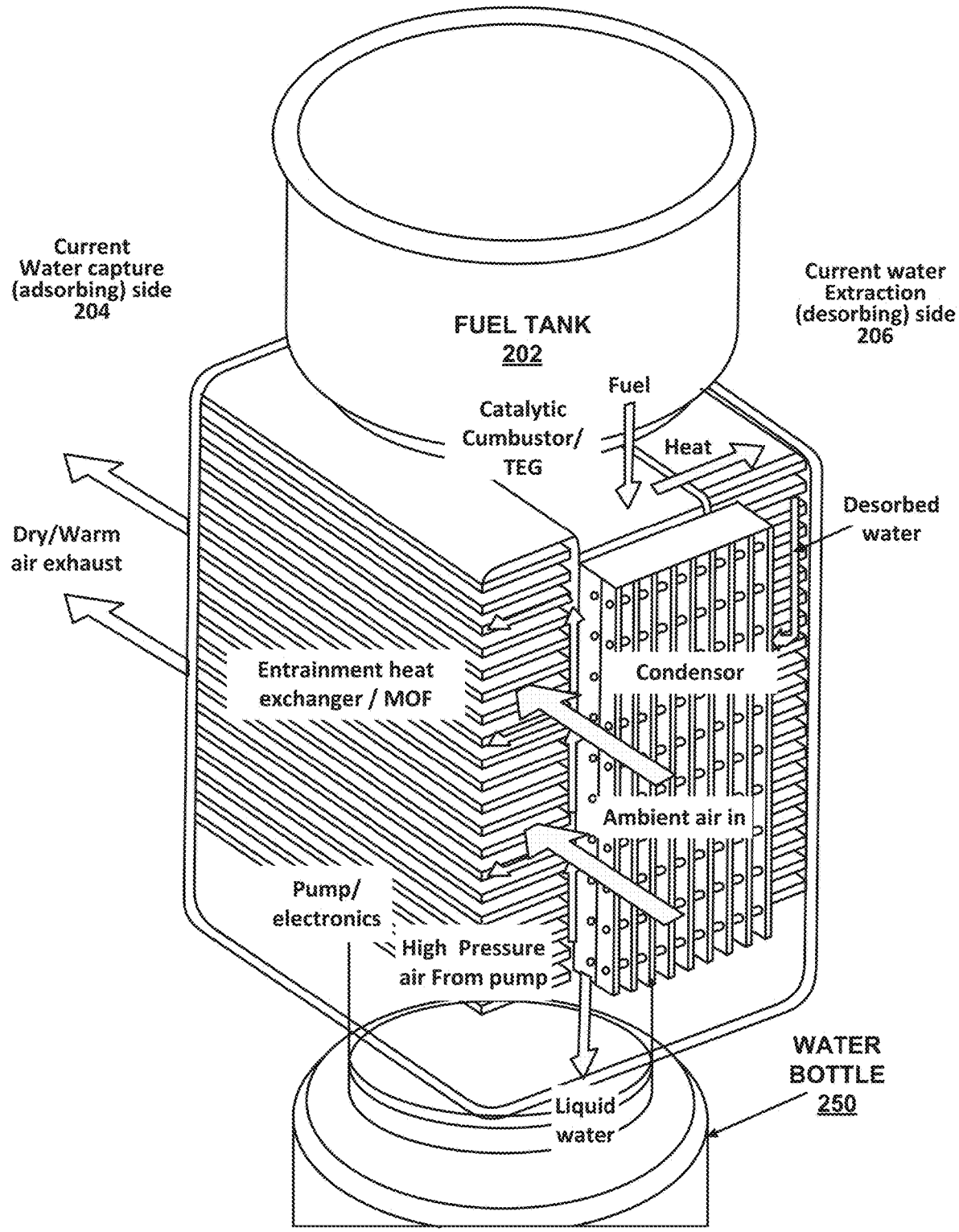
FIG. 2 shows a diagram of a system for implementing the techniques of this disclosure.

FIG. 2 illustrates an example of a system for implementing the techniques of this disclosure. System 200 includes fuel tank 202, adsorbing side 204, desorbing side 206, condenser 210, and water bottle 250. FIG. 2 will be described from the perspective of adsorbing side 204 being configured to perform water capture (adsorption) and desorbing side 206 being configured to perform water extraction (desorption). Adsorbing side 204 and desorbing side 206, however, may be highly similar, or even identical, such that each side is capable of performing both adsorption and desorption. When system 200 is running, each side may cycle between performing both adsorption and desorption.

Adsorbing side 204 may intake ambient air and perform adsorption in the manner described above with respect to adsorbing side 104 of FIG. 1. At desorbing side 206, catalytic combustor 242 may operate in a manner similar to catalytic combustor 142 described above and create a controlled burn of a fuel-air mixture to generate heat. TEG 244 may operate in a manner similar to TEG 144 described above and convert a portion of the heat to electrical power to provide power to system 200. The remaining heat passes through to a desorption module to supply sufficient enthalpy of adsorption to release water vapor, which can be condensed and stored in water bottle 250.

It should be understood that FIG. 2 is intended to show one possible physical form factor for implementing system 100 of FIG. 1 and thus certain components, such as internal components of system 200, are not shown or explicitly described.

The fuel stored in fuel tank 102 or 202 may be a hydrocarbon-fuel that provides thermal power to the sorbent bed in the form of waste heat from a thermal-to-electrical conversion, thus using more of the fuel's available chemical energy. A hydrocarbon fuel may have a relatively high energy density, may be fluid, and may be readily available, such that hydrocarbon fuels may have low weight, volume, or accessibility requirements compared to other energy sources.

In the examples of FIGS. 1 and 2, system 100 and/or 200 includes two substantially identical halves, e.g., adsorbing side 104 and desorbing side 106, adsorbing side 204 and desorbing side 206, so that one side adsorbs and consumes electrical power while the other desorbs and generates electrical power. Each half includes three major components: a thermal source (e.g., catalytic combustor) configured to generate heat, a heat-to-electricity converter (e.g., thermoelectric generator) configured to convert at least a portion of the generated heat to electrical power, and a sorption module (e.g., a MOF-coated heat exchanger that uses flow-entrainment technology) configured to desorb water using at least a portion of the generated heat and adsorb water using forced air.

Without being limited to any particular theory or design, system 100 and system 200 may operate based on the following observations:

While MOF performance improvements may be made in terms of adsorption kinetics, low-RH uptake, and stability, the MOF enthalpy of adsorption may still be 40 kJ/mol (at 100 C) or higher, due to the nature of the physical adsorption mechanisms. For a portable system, at least 140-190 W of thermal energy (~40 kJ/mol water, 616 W-hr/kg water×5.5 kg/24 hr) may be required to desorb water to meet a water production metric of 5.5-7.5 kg water/day. Sensible energy may be very small (<5%), by comparison.

This power level may not be readily available for harvesting from ambient energy sources, but hydrocarbon fuels have sufficient energy density and specific energy to provide this power within the targeted device size (e.g., human-portable) and weight envelope.

Significant additional electrical power may be used for heat exchange during adsorption and condensation, such as for providing forced air flow. For example, heat exchangers with improved performance (introduced and discussed in more detail below) in terms of area-specific thermal resistance and pneumatic efficiency may be implemented to remove heat from the sorbent during the adsorption process and for water condensation (estimated that ~25 W of electrical power may be needed in some examples).

TEGs may be available with efficiency of up to 12%, close to the ratio of electrical to thermal power required. By flowing the waste heat from this conversion to the MOF bed for desorption, nearly all of the energy can be effectively used.

Figure 3:
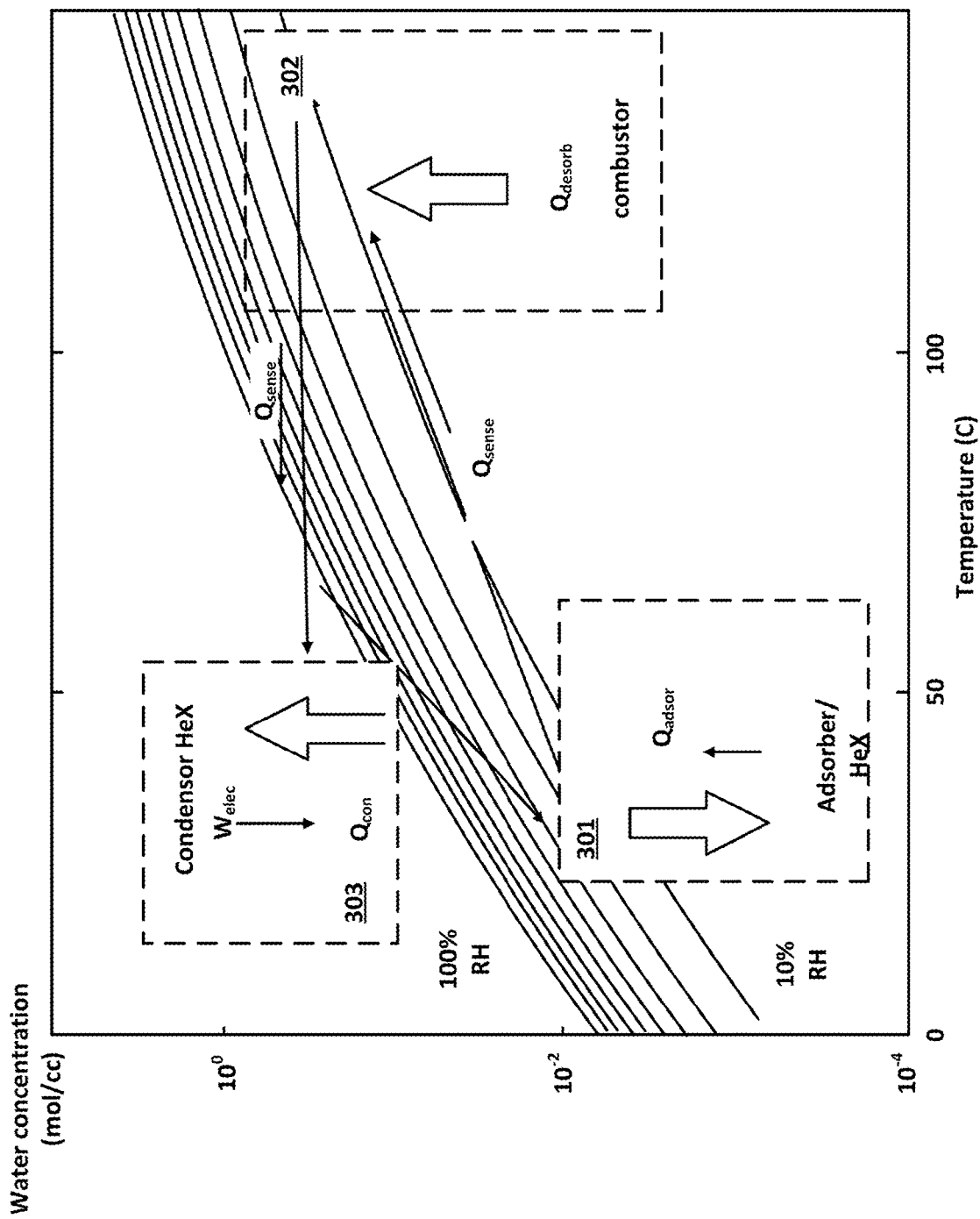
FIG. 3 shows a system cycle diagram of a system for implementing the techniques of this disclosure.

FIG. 3 shows a system cycle diagram of a system for implementing the techniques of this disclosure. The techniques of FIG. 3 may, for example, be performed by system 100 or system 200 described above. The system cycle diagram of FIG. 3 may illustrate temperature and water concentration for adsorption (at state 1), desorption (at state 2), and condensation (at state 3) of water from air having a relative humidity of 20%.

On the adsorbing side (e.g., adsorbing side 104 of FIG. 1 or adsorbing side 204 of FIG. 2), such as indicated as state 1 in FIG. 3, slats may be opened to allow influx of ambient air. The MOF-coated heat exchanger is activated by providing high-pressure input air from a pump. Rather than a conventional fan, the heat exchanger uses compressed air from a pump or high-pressure blower moved through micro jets on the fins, which entrains additional air from ambient and provides thermal and mass transfer at improved size and energy efficiency—e.g., up to 5× and 3× respectively due to enhanced turbulence at the air/fin interface. Sufficient air is entrained to both cool the adsorber (FIG. 3, 301) and provide sufficient mass flow (~2000 SLM) to fill the MOF with water (water uptake) under the driest conditions.

On the desorbing side (e.g., desorbing side 106 of FIG. 1 or desorbing side 206 of FIG. 2), a hydrocarbon fuel (e.g., butane, gasoline) is mixed with air and routed to a catalytic combustor (e.g., catalytic combustor 112 or 212). The combustor employs, for example, a platinum catalyst to create a controlled burn of a fuel-air mixture at a temperature much lower than the adiabatic flame temperature. The fuel-air mixture is reacted at the catalytic surface to produce approximately 250 W of heat. The heat is coupled to the hot junction of a TEG (e.g. BiTe or PbTe) and a fraction (10-12%) is converted to DC electrical power) which is used to power the system (e.g., controllers, compressors, valves, etc.). The remaining heat passes through to the TEG cold plate, which is thermally linked to the MOF-coated heat exchanger, which operates as a passive evaporative heat sink. The heat applied to the MOF (FIG. 3, 302) supplies the necessary enthalpy of adsorption to release the water. By dividing thermal and electrical energy in this way, nearly all of the chemical energy in the fuel is used; sources of loss are discussed below.

The water vapor released from the MOF diffuses to a condenser (e.g., condenser 110 or 210) where it is cooled below the dew point and condenses to liquid water (FIG. 3, 303) and routed to a bottle for storage.

The sides, e.g., the adsorbing side and the desorbing side, are switched at each cycle. Using the fastest cycling rate possible—limited by the kinetics of the adsorber—allows for the smallest amount of sorbent and substrate, and therefore the smallest system volume and lightest weight. In one example, 0.8 g/g water uptake and a preliminary sorbent (one of two identical units) design with 60, 7 cm×2.5 cm fins and 0.45 mm of 70% porous MOF can result in a total adsorbing area of ~2000 cm³. That allows for ~15 g of each of two differently optimized sorbents.

A microcontroller-based electronics system manages power conversion and controls gas flows via low-power valves. The microcontroller-based electronics may include microprocessors, digital signal processors (DSPs), application specific integrated circuits (ASICs), field programmable gate arrays (FPGAs), discrete logic, software, hardware, firmware or any combinations thereof.

Figure 4:
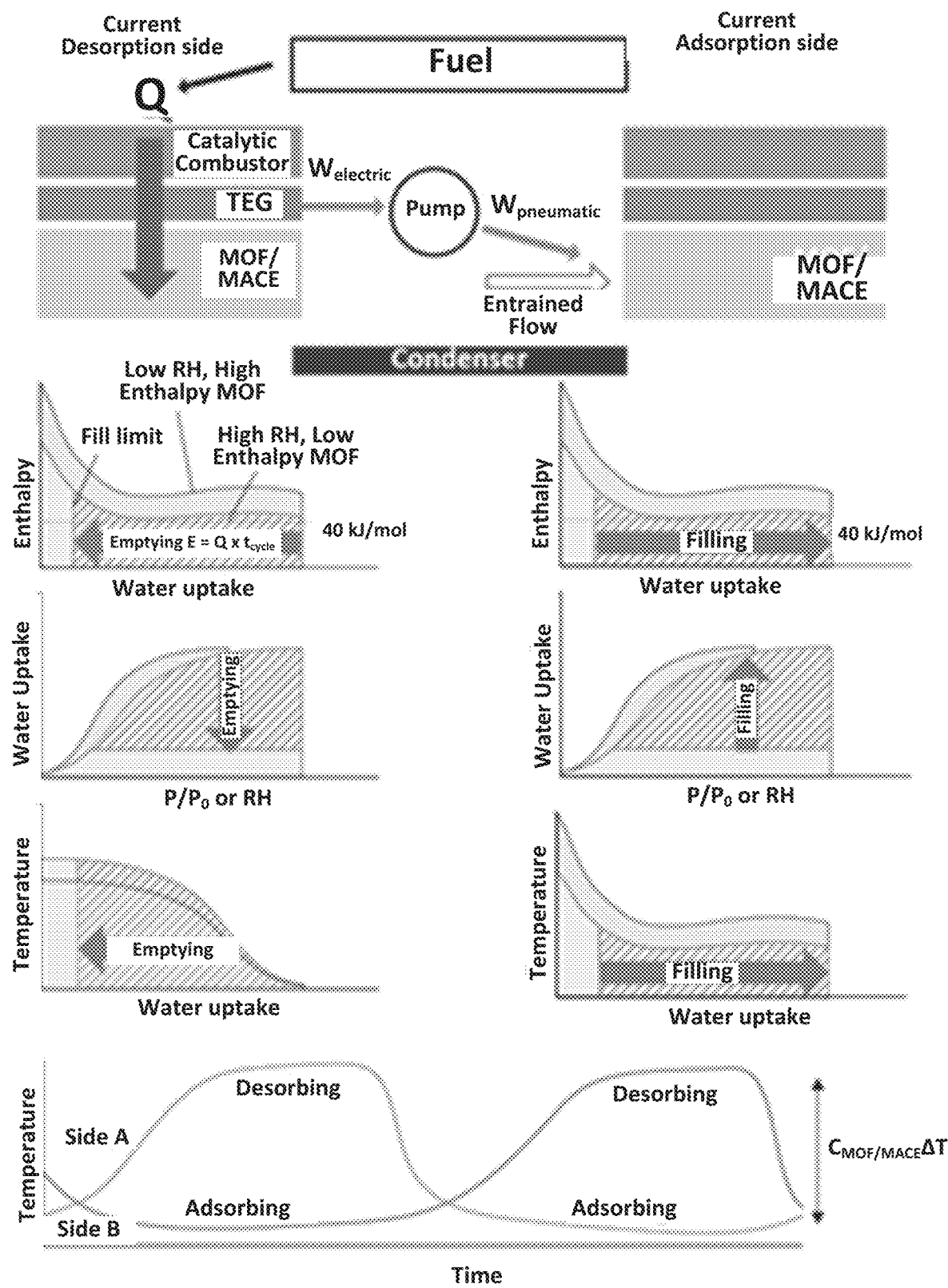
FIG. 4 shows a system cycle schematic for a system for implementing the techniques of this disclosure.

Aspects of cycle and energy flow will now be discussed. During the desorption process, the most loosely bound molecules are desorbed first. Desorption enthalpy increases as the water uptake level of the MOF is reduced. A design such that the MOF is entirely emptied (or entirely filled). In FIG. 4, the total energy associated with a single desorption cycle is the area under a curve, and the total electrical energy available for a single cycle is proportional to this (dependent on the thermal to electrical efficiency). It may be desirable to design the total desorption energy and electrical energy of the system such that there is always sufficient electrical energy to complete adsorption.

The amount of electrical power needed for the pump may be estimated at 25 W. 10% total heat to electrical conversion efficiency (assuming 12% electrical efficiency and thermal coupling efficiency of >90%) suggests that ~225 W of thermal power may be available for desorption. In the driest (most challenging) ambient conditions (10% RH at 27 C), MOFs have been demonstrated with an average enthalpy over the entire uptake curve of approximately 70 kJ/mol. The techniques of this disclosure may improve this to 55 kJ/mol or less across the range of required humidity. This maps to approximately 190 W of thermal power for constant desorption.

The need for similar input thermal power levels for both the creation of electrical power and for water desorption suggests that it is possible to create a system that uses the majority of the energy available from the highest available energy density source. As one example, supplying a total thermal power of 225 W to the catalytic combustor may require an equivalent of approximately 250 W worth of chemical energy to account for thermal losses through the packaging.

Figure 5:
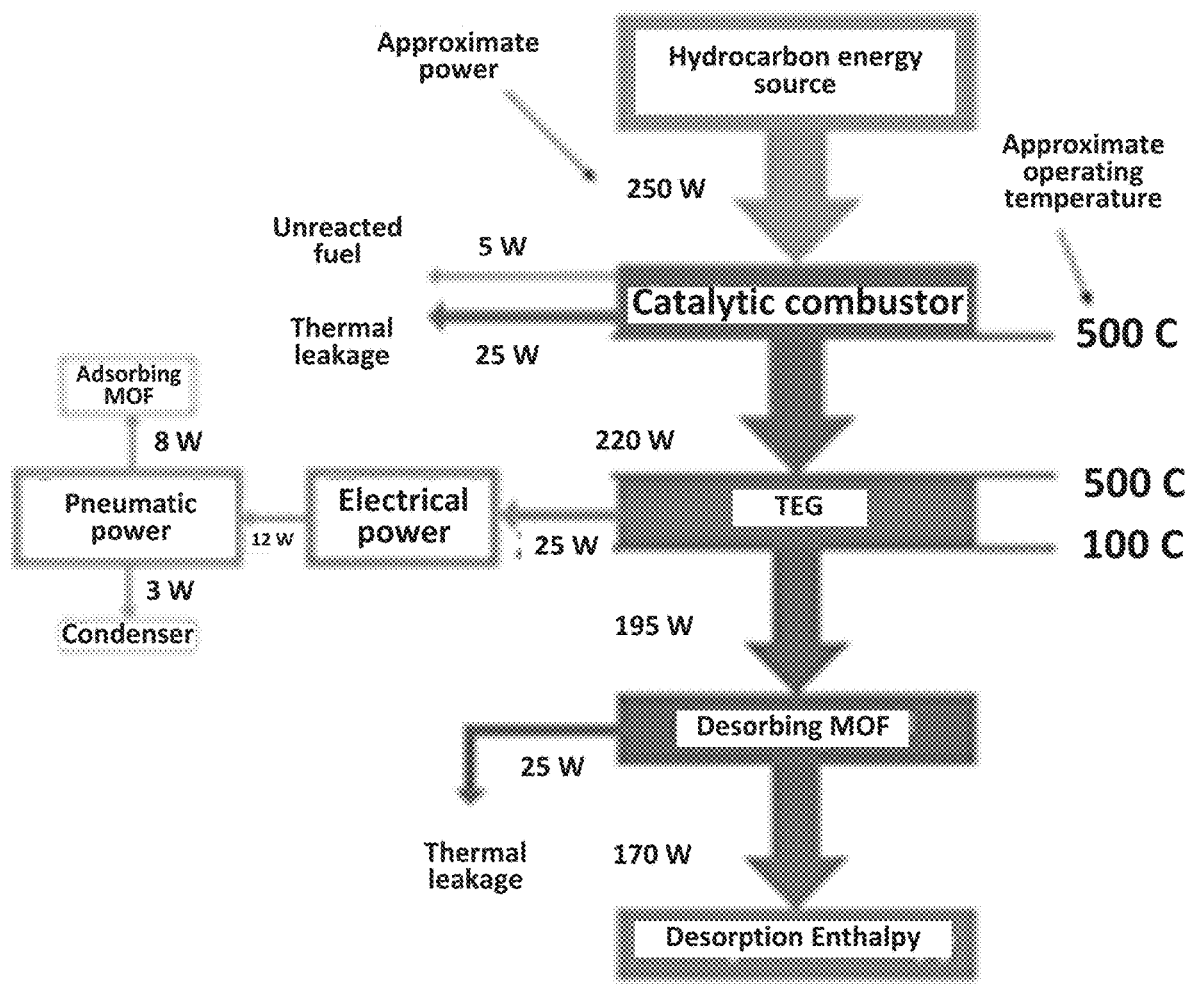
FIG. 5 shows a system energy flow, using an example of 250 W of fuel simultaneously providing sufficient heat for desorption and for electrical power generation.

FIG. 5 shows an example system energy flow, with respect to components of system 100 of FIG. 1, using an example of 250 W of fuel simultaneously providing sufficient heat for desorption and for electrical power generation.

As water desorption occurs, the relative humidity near the MOF surface necessary for desorption drops; given a constant condenser temperature and thus a constant concentration necessary for condensation, the temperature may slowly rise throughout the cycle. Targeting a condenser temperature of 60-70 C, a typical low-RH MOF that is designed to be in equilibrium with 5% RH gas may need to be heated to 90-100 C. By using only the steep section of the MOF isotherm, a typical change in RH over the desorption cycle is only approximately 2%, meaning the desorption temperature may change by only ~10 C over the course of the cycle. Water droplets collect and pass through a carbon filter on their way to a collection vessel.

At the end of the cycle, the two sides are switched; at this point the new adsorbing MOF must be cooled. This sensible energy necessitates approximately 1-2 W of extra electrical power.

The discussion below describes in detail the challenges of various subsystems of systems 100 and 200 and how to achieve desirable system metrics. This description follows the energy flow from the hydrocarbon fuel through to the heat exchanger and sorbent.

Aspects of a combustor, such as catalytic combustors 112, 142, and 242, will now be discussed. A high energy density heat source may be used to drive the proposed condensation/evaporation cycle. Approximately 4700 W·hr may be needed to recover 7.5 kg of water captured by the MOF. Due to the intermittent nature of solar and limited harvestable environmental energy, an on-board energy source may be used instead of in addition to other energy sources such as solar. Batteries, such as Li-ion batteries, may be insufficient as a sole energy source due to low specific energy and energy densities. For example, a 4700 W·hr battery would weigh 17.7 kg and occupy 6.81 which may be undesirably large and heavy for many applications. In comparison, hydrocarbons have much higher energy content, and when combined with a thermoelectric generation can provide both the thermal and electrical energy required to operate a system such as system 100 or system 200. Assuming 80% utilization of the chemical energy (described below), only ~0.5 kg and 0.6-0.8 L of fuel would be required. Micro- and meso-scale combustors have received significant attention for potential application in portable electronic power, and among the most common pairings found in the literature are propane or butane-burning catalytic combustors coupled to thermoelectric generators.

Catalytic combustors implement platinum catalysts to allow for highly efficient burning of fuel/air mixtures at temperatures in the range of 200-600° C., significantly lower than open flame temperatures of approximately 1500-2000° C. The lower operating temperature allows for greater material compatibility and simplifies the thermal management required to minimize heat loss. Additionally, the lower temperature enables compatibility with commercial TEGs, which can operate with hot side temperatures of 250-350° C. for BiTe materials and up to 600° C. for PbTe materials. Catalytic combustors can be designed with nearly planar geometries with lateral dimensions matched to available TEG modules, enabling highly efficient heat transfer from the combustion chamber through the TEG. Examples from the literature demonstrate that 95% combustion efficiency can be achieved with relatively simple combustor design and that 90% of thermal energy can be transferred to the TEG modules.

Combined with PbTe based TEG modules capable of 12% thermal to electrical efficiency, such a system is capable of 10% chemical to electrical conversion efficiency when combined with proper thermal design ensure heat is coupled to the TEG, as discussed with respect to the system thermal design. Additionally, in the present application the "waste heat" dissipated on the cold side of the TEG is used to provide the enthalpy of evaporation to the water entrapped in the MOFs, resulting in more than 80% utilization of the chemical energy stored in the hydrocarbon fuel.

As described in FIGS. 1 and 2, example systems include catalytic combustors configured to combust and generate heat from a fuel, such as an energy dense hydrocarbon fuel. Catalytic combustors 112 and 142 may be built using commercially available platinum-loaded alumina pellets contained within a metal combustion chamber. The lateral dimensions of the chamber may be sized to match the MOF heat exchanger and the interior height of the chamber may be sized to provide a ~1 mm deep flow channel above the catalyst pellets, which are 3.2 mm in diameter. The perimeter walls of the chamber may be constructed of a low thermal conductivity metal such as stainless steel (~15 W/m·K) to help reduce perimeter heat losses while the top and bottom plates may be constructed of a high thermal conductivity metal such as copper (~400 W/m·K) to conduct heat into the TEG modules as well as to homogenize the combustion temperature laterally within the chamber, preventing hot or cold spots. While the lateral dimensions are essentially determined through matching to the heat exchanger, the number and packing density of the pellets, size of the flow channel above the pellets, and precise thickness of the stainless steel walls and copper plates may need to be tuned to optimize combustion efficiency, pressure drop, and steady state temperature.

In some instances, catalytic combustors may have a combustion efficiency of 96% for a stoichiometric fuel/air mixture, and efficiencies of 92-94% may be achieved when the fuel/air mixtures are +/−20% of the stoichiometric ratio, providing a wide operating window. The combustor dimensions and fuel/air flow rates in the literature implementation were similar to those being targeted, so similar combustion performance is expected.

In some examples, combustors may be configured for self-contained ignition of the fuel. Mixtures of lower hydrocarbons (i.e. methane-butane) and air, even in the presence of a catalyst such as platinum, typically do not spontaneous ignite near room temperature. Rather, it is necessary for the fuel/air mixture to be heated to a temperature in the range of 200-300° C. to achieve ignition, after which combustion becomes self-sustaining.

This disclosure proposes to achieve self-contained ignition by using a catalytic heating element. An ignition heater can be embedded onto the cover plate of the combustion chamber near the gas inlet, separated from the copper layer by an insulating layer of silica or alumina. The insulating layer can be very thin and may be deposited using sputtering methods, and the heating element (Pt or PtTi alloy) may be deposited using evaporation or sputtering methods in conjunction with shadow masks. A small on-board rechargeable battery may be used to provide current (0.1-0.5 A) through the element, raising its temperature to ~250° C. and providing the hot catalytic surface required to initiate combustion.

Systems describe herein may include one or more components configured to mix and deliver fuel and air to the catalytic combustor. With Butane (7.56 W·hr/L), although other fuels may also be used, fuel-air mixing can be accomplished through relatively simple means. For butane/air combustion, the supply pressure of the butane fuel may be fixed based on its vapor pressure of 230 kPa near room temperature, with mixing achieved via proportional control valves. During initial testing, the gas flows may be controlled using precision mass flow controllers, and additional pressure and temperature sensing may be used to optimize combustion efficiency and develop models for achieving control during stand-alone operation.

Figure 6:
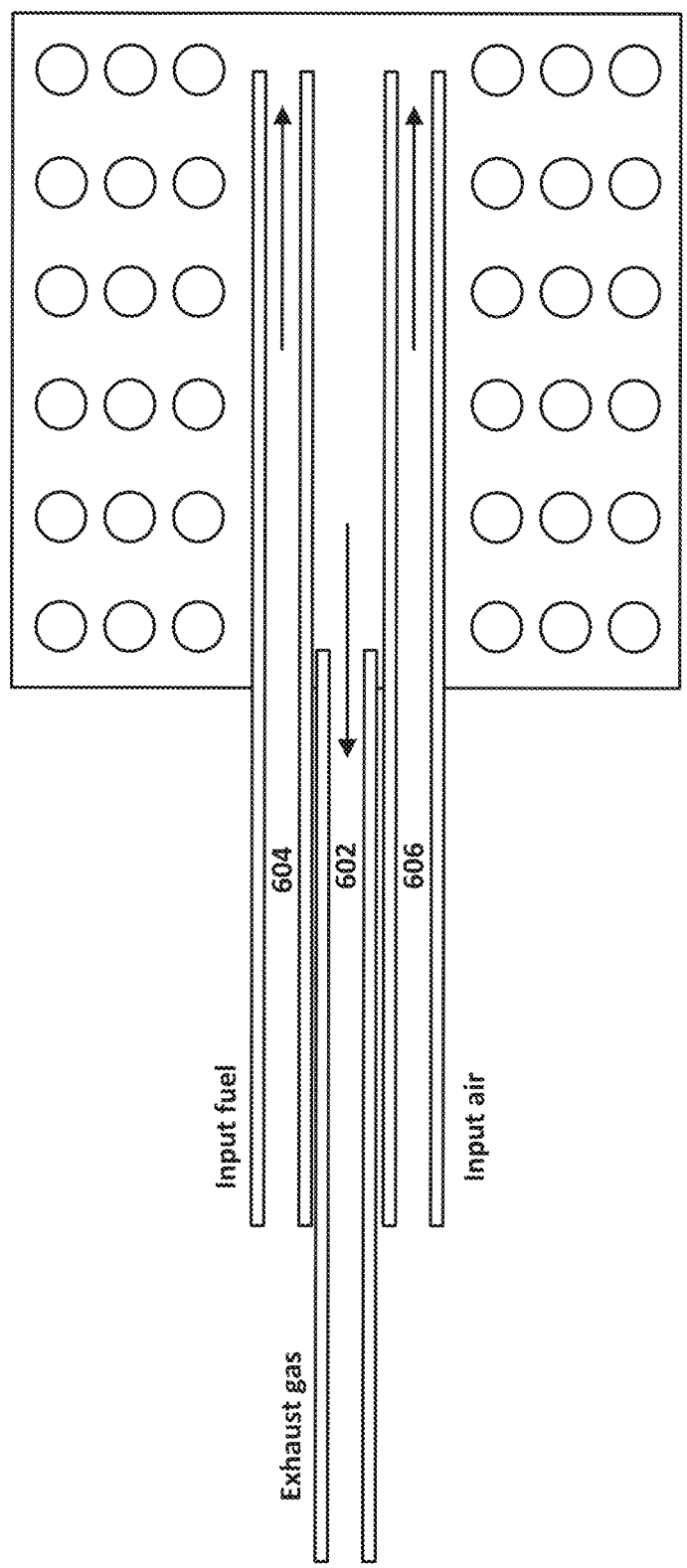
FIG. 6 shows a schematic of fuel/air input and exhaust output of combustor showing preheating of liquid inputs and counterflow exchange of exhaust and input streams.

To achieve the maximum chemical energy utilization, it may be beneficial to recover the waste heat from the combustor exhaust gas. Based on preliminary analysis of the air flow required, in one example, approximately 37 W of heat may be contained in the exhaust stream of a 250 W combustor. As shown in FIG. 6, by routing the exhaust gases through counter-flow heat exchanger 602, approximately 90+% of the exhaust heat may be recovered and used to preheat the fuel-air input mixture in fuel channel 604 and air channel 606, respectively, thus retaining that heat within the combustor and reducing fuel use.

For implementations with kerosene or diesel fuel as the combustor fuel (9.8-10.0 W·hr/l), additional measures may be required for delivery and combustion. Since these fuels are liquid at room temperature, the fuels may need to be preheated to provide the gas-phase combustive fuel-air mixture. A simple means of accomplishing this, which is commonly employed in liquid-fueled camp stoves, is to route the fuel delivery lines through the combustion zone so that a fraction of the combustion heat provides the latent heat required to evaporate the fuel (FIG. 6). In the case of diesel fuel, to provide ~250 W of combustion heat, ~10 W needs to be provided to the liquid fuel in order to vaporize it to generate a combustive fuel-air mixture.

In addition to the latent heat required for vapor generation, additional air pressure may be required to pressurize the liquid fuel tank to provide a driving force to move the liquid fuel from tank to combustor. Compared to the air flow required for combustion, this backing air-flow is relatively small (~0.1 SLM), and can easily be drawn from the main system pump. A pressure sensor and solenoid valve may be employed to maintain a constant pressure/velocity for liquid fuel delivery.

Aspects of TEGs, such as TEGs 114 and 144, will now be discussed. For an example system that requires the 250 W of heat and 25 W of electrical power, a TEG can be efficiently employed to produce required electrical power required by the system, passing waste heat on to the MOF. The conversion of 250 W of heat into 25 W of electrical power requires an overall conversion efficiency of ~10%. State of the art TEGs with efficiencies of up to 12% are commercially available. The main challenges in the TEG subsystem are achieving the required electrical power conversion efficiency, achieving good thermal coupling between the TEG and the combustor (>90%; see system thermal design), and operating the TEG at high temperature to achieve the highest efficiency possible.

Without being limited to any particular theory, the figure of merit $ZT = S^2 \rho^{-1} \kappa^{-1} T$ may be calculated from the Seebeck coefficient (S), electrical resistivity ($\rho$), and thermal conductivity ($\kappa$) and can be used to represent the thermoelectric material's efficiency at turning heat into electrical power—higher ZT corresponds to higher efficiency. $Bi_2Te_3$ exhibits reasonable ZT, but peaks around 350K. Other materials, such as PbTe and TAGS, may be better suited for higher temperatures and exhibit higher efficiency at these temperatures, as seen in the figure.

Pb/TAGS modules exhibit the highest efficiency in commercially available TEG modules, with peak energy conversion efficiency of up to 12%. Pb/TAGS module exhibits higher conversion efficiency than BiTe, even at low thermal power. This improved efficiency comes as a result of Pb/TAGS's lower thermal conductivity and lower electrical resistivity—parameters that result in higher ZT and therefore higher efficiency.

The lower thermal conductivity of Pb/TAGS modules allows operation at higher temperatures needed to reach high efficiency. Pb/TAGS modules, compared to BiTe modules, generate more power with less heat, and do so under conditions suited to the combustor. To generate 25 W, a Pb/TAGS area of only 20 cm$^2$ is required. Sufficient advances in MOF technology, particularly enthalpy of adsorption, may allow for a system re-optimization that allows for the use of BiTe TEG modules.

The thermal interface between the TEG and combustor presents unique challenges to the system design. The combustor may reach relatively high temperatures, and both the TEG and the combustor present somewhat irregular surfaces. A thermal interface material that can handle very high temperatures without degradation or deformation is required. Graphite gasket material is recommended by the Pb/TAGS manufacturer to interface between the TEG and heat source; materials such as pyrolytic graphite may be used to spread heat. The techniques of this disclosure may utilize this material but high temperature thermal epoxies or other metallic interfaces may also be used.

Given the unique geometry of this system, a custom TEG may be desirable to further optimize the system, whether to achieve a specific shape and fill factor, or specific TEG thermal properties required for system performance.

Aspects of heat exchangers and sorbent structures, that may be included with adsorbers 118 and 148, will now be discussed. Achieving, for example, 7.5 kg of water may require substantial airflow to the MOF—as much as a constant 2000 SLM—to supply sufficient water in dry ambient conditions. Additionally, it may be necessary to cool the MOF to remove the enthalpy of adsorption, as not doing so may result in a temperature rise that slows or stops water uptake, and provide conductive heat transfer during desorption. The techniques of this disclosure propose to solve this problem by applying the sorbent to exchanger fins with embedded high-pressure micro jets, which entrain high-flow air from ambient.

Figure 8:
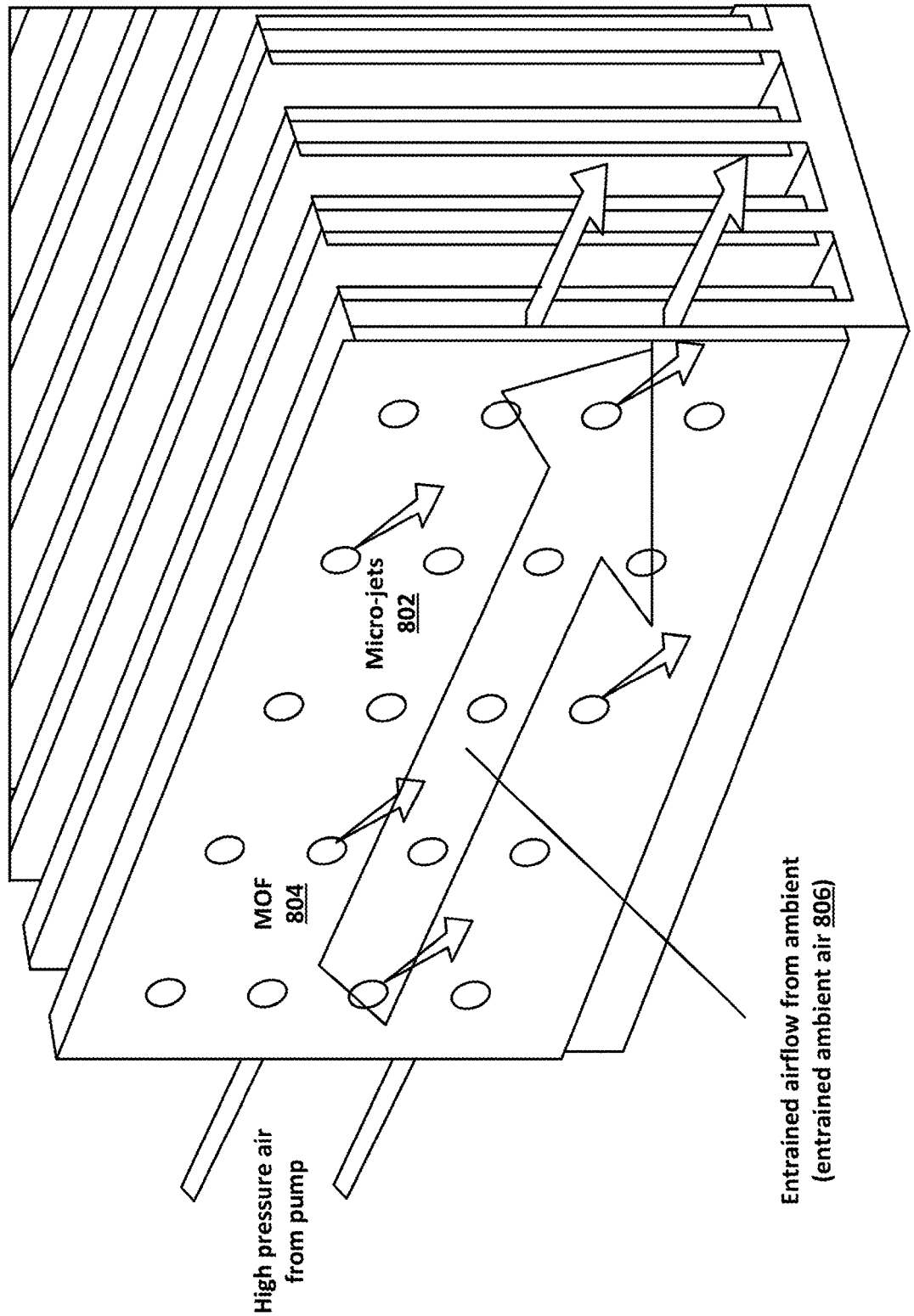
FIG. 8 shows an example schematic of a heat exchanger.

FIG. 8 shows an example schematic of a heat exchanger. The system of FIG. 8 may achieve improved pneumatic efficiency by using a single efficient high-pressure compressor, and using micro jets 802 on MOF 804 to entrain ambient air 806, amplifying the total airflow through the heat exchanger by a factor of over 30. Micro jets 802 also create turbulence at the fin surface, enhancing heat and mass transfer by 3-5×.

This design has potential advantages over other approaches:

Due to enhanced turbulence, heat exchange process efficiency was measured between 30-60% depending on fin spacing, while a more conventional design optimized for this purpose would typically achieve 10-20%. The improvement is due to the turbulent cooling enhancement, which also enhances mass transfer.

The small fans used on conventional exchangers are generally highly inefficient in terms of electrical to mechanical to pneumatic power conversion; numbers near 3% are typical. Off-the-shelf exchangers often implement more efficient blowers, which operate up to 15-35% efficiency in the high-flow regime. By operating a blower at its highest efficiency high-pressure, low-flow regime, efficiencies of >50% are achievable. (a small diaphragm pump may also be a solution).

Because the high pressure flow is internally plumbed, it can easily be re-routed, allowing the use of a single compressor for two separate water adsorbers and a condenser.

The most efficient way to achieve simultaneous high volume and energy efficient heat and mass transfer is matching the ambient airflow necessary for each to avoid wasting pneumatic power moving excess air. The design allows for this optimization to occur, and a preliminary analysis shows that both heat and mass transfer requirements for AWE are achievable using this approach.

Aspects of heat transfer will now be described. This disclosure establishes a target temperature for the adsorbing MOF. Existing MOFs designed to uptake water at below 5% RH begin to exhibit substantially higher heat of adsorption; thus, this disclosure considers the case of most challenging environmental metric of 10% RH at 27 C and conclude that the MOF should be limited to a temperature rise of approximately 20 C to avoid less than 3-4% local humidity, assuming a reduction in low-RH enthalpy compared to state of the art during the MOF development. Full optimization may depend on the enthalpy of adsorption and adsorption isotherms of the highest-performing MOF materials.

It has been demonstrated at small scale an area specific thermal resistance of 4.7 C·cm$^2$/W (base area) at 0.3 W/cm$^2$ and a COP of 33. A 7 cm×7 cm×2.5 cm (×2 sides) scaled design would move 190 W of heat with ~20 W of electric power, accounting for a ~20% decrease due to micro-surface roughness.

Aspects of mass transfer will now be described. This disclosure also considers the amount of airflow necessary to supply water vapor to the system at the 10% RH ambient condition; accruing 5.5 L/day may use a minimum 1500 SLM; however, this assumes 100% adsorption efficiency, i.e., an exit humidity of 0%. An adsorption bed may essentially be a packed-bed reactor with a linear rate law (since diffusion is the limiting step and diffusion is linear with concentration). This suggests that, for example, an efficiency of 75% would require a ~80% higher average mass diffusivity than would naively be expected by the inlet concentration; for this reason, this disclosure assumes that at least 2000 SLM of flow is needed for water vapor supply.

Heat exchange process efficiency in a traditional air-cooled exchanger is low; a high-end fan-based CPU cooler of approximately the correct size for this system may be about 10-20% heat-exchange efficient; this would represent an unacceptable 43 C temperature rise, in addition to having higher volume and power requirements.

Due to flow entrainment, the proposed design can provide this flow at the same time it provides cooling, but it may be necessary to achieve the entrainment ratios previously observed at a 3 mm fin spacing at a smaller fin spacing of 2 mm to meet the stringent volume requirements in AWE. This disclosure provides following improvements and optimizations to achieve this:

Further optimization of the nozzle design, angle, and spacing. This parameter space was left largely unexplored; data shows considerable sensitivity to nozzle angle.

Improved MOF material that can adsorb at <4% RH without a large increase in adsorption enthalpy, or adsorb at 4% RH with a decrease in adsorption enthalpy.

Modifications to the compressor to increase electrical-to-pneumatic efficiency to 60% (see Compressor).

Aspects of a preliminary geometry will now be discussed. This disclosure describes a preliminary design to assess available MOF surface area and volume, and conductive heat transfer to the MOF during the desorption cycle. This disclosure considers a single one of two complete heat exchanger/embedded MOF units (one is desorbing while the other adsorbing). A 29-fin design on a 7×7 cm area with a 2.5 cm fin height allows for 2030 cm$^2$ of surface area when applied to each of two sides of the central TEG/catalytic combustor unit. With 0.30 mm fin thickness, plus 0.45 mm thick of MOF on each side, a gap between the fins of 1.2 mm may be maintained, slightly smaller than the 1.5 mm gap in the 2 mm fin spacing geometry. 50-100 um copper or aluminum foil on each side yields an acceptable ~15 C average temperature delta over the fin during the desorption cycle. While these numbers are not necessarily optimal, and this many-parameter optimization problem may be further evaluated, the geometry below can be used to assess approximately that necessary mass transfer rates are possible to meet water adsorption metrics.

This geometry allows for ~30 g of MOF per MOF unit (i.e., 30 g of MOF adsorbing at any one time); allowing for two different types of MOF optimized for different ambient conditions, this indicates a ~7 min cycle time. A cycle of 40 minutes in an existing test system with a considerably thicker (1" diameter) porous structure has been observed. The mass transfer necessary to achieve this cycle time will be described below.

Aspects of sorbent substructure design and mass transfer projections will now be discussed. Transferring sufficient mass of water vapor to the MOF for adsorption requires mass transfer rates from the incoming gas stream to the MOF intracrystalline structure.

Figure 7:
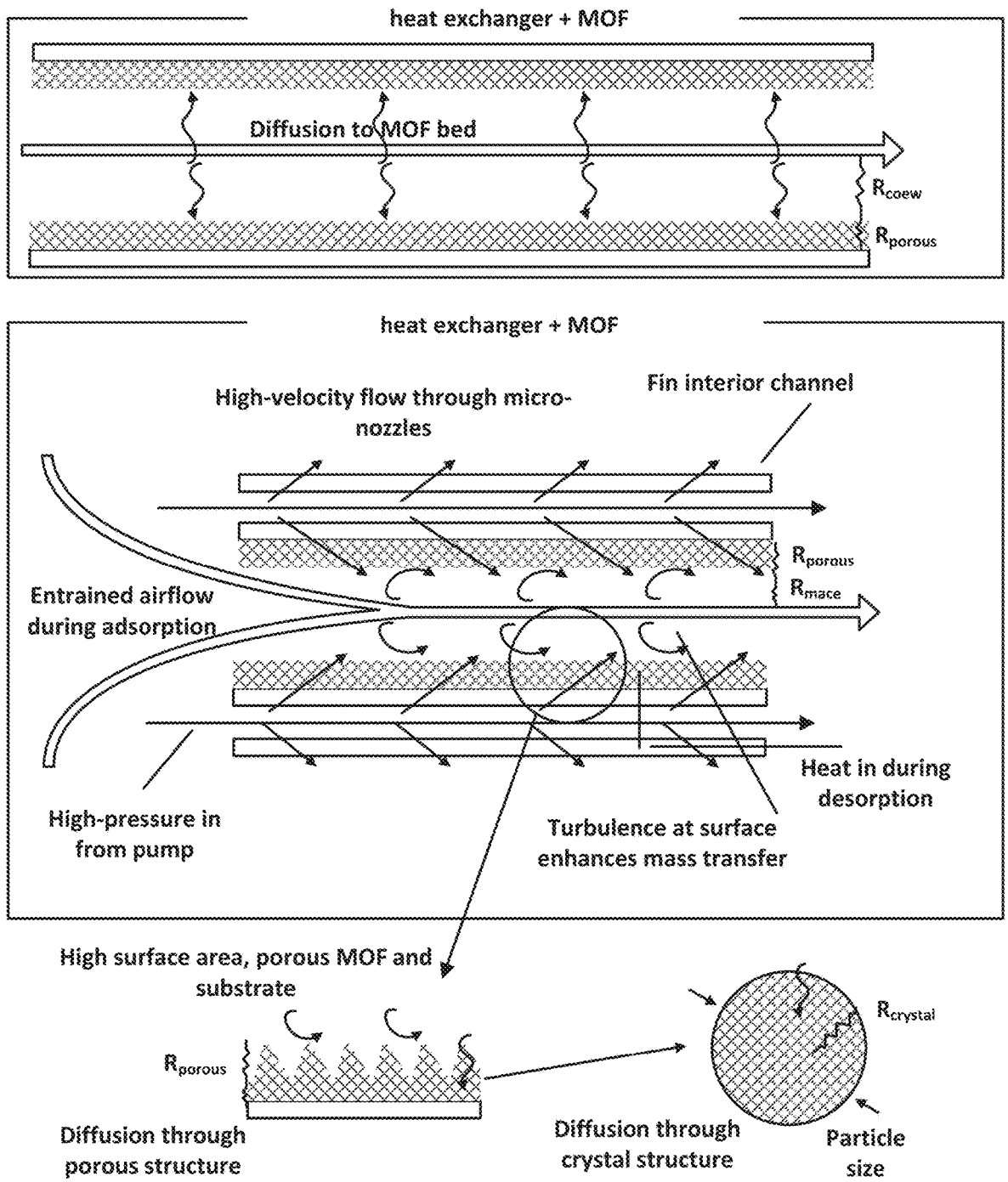
FIG. 7 shows an example of water diffusion in porous and a faster sorbent bed with water capacity requires less mass and volume allocated to the sorbent.

The finned geometry described above allows for approximately 2250 cm$^2$ of 0.45 mm thick MOF on each of two identical MOF-coated heat exchangers. Mass diffuses perpendicular to the incoming gas stream, through the MOF superstructure, and into individual MOF crystals (generally referred to as MOF kinetics). Each of these steps may be associated with a diffusive "resistance" to perform a simple, approximate analysis of the mass transfer problem (FIG. 7). This sets up parameter-space optimization on MOF mass, particle size, porosity, thickness, and fin spacing. For a bed of porous MOF that lacks other materials; binders may be needed in small quantities in practice, but thin layers of MOF may not require other materials for heat transfer, assuming for example that there is only a 2-4 C temperature drop across the MOF.

Preliminary mass transfer calculations show that the micro jets in the design create surface turbulence and increase heat transfer by breaking up the laminar boundary layer, which may produce the same enhancement for mass transfer. With this enhancement, the largest mass transfer resistance is likely to occur in the porous MOF bed. Diffusion may be considered as a function of porosity and pore size; maximizing this diffusion requires a MOF particle size of ~40 um and a high porosity of ~70%; a rough surface (macroscopically jagged, see FIG. 7) reduces the effective mean diffusion path length and increases the effective area by ~25-50%. Available data on crystal diffusion suggests a value near 5E-10 m$^2$/s; this disclosure targets a ~1.6× improvement using the screening process outlined in the MOF section. This puts crystal diffusion on the same order as the other mass transfer steps; all totaled, this suggests that necessary mass transfer rates are possible in this configuration.

Aspects of packaging and system thermal design will now be discussed. The use of catalytic combustion to meet stringent energy needs, as well as the need for high temperatures for water desorption makes it desirable to consider the system-level thermal design to minimize heat loss. The problem may be approached by applying two types of insulation optimized for high and low-temperature sections of the system. For the latter, a miniature vacuum-insulated panel design to minimize volume may be used.

Figure 9:
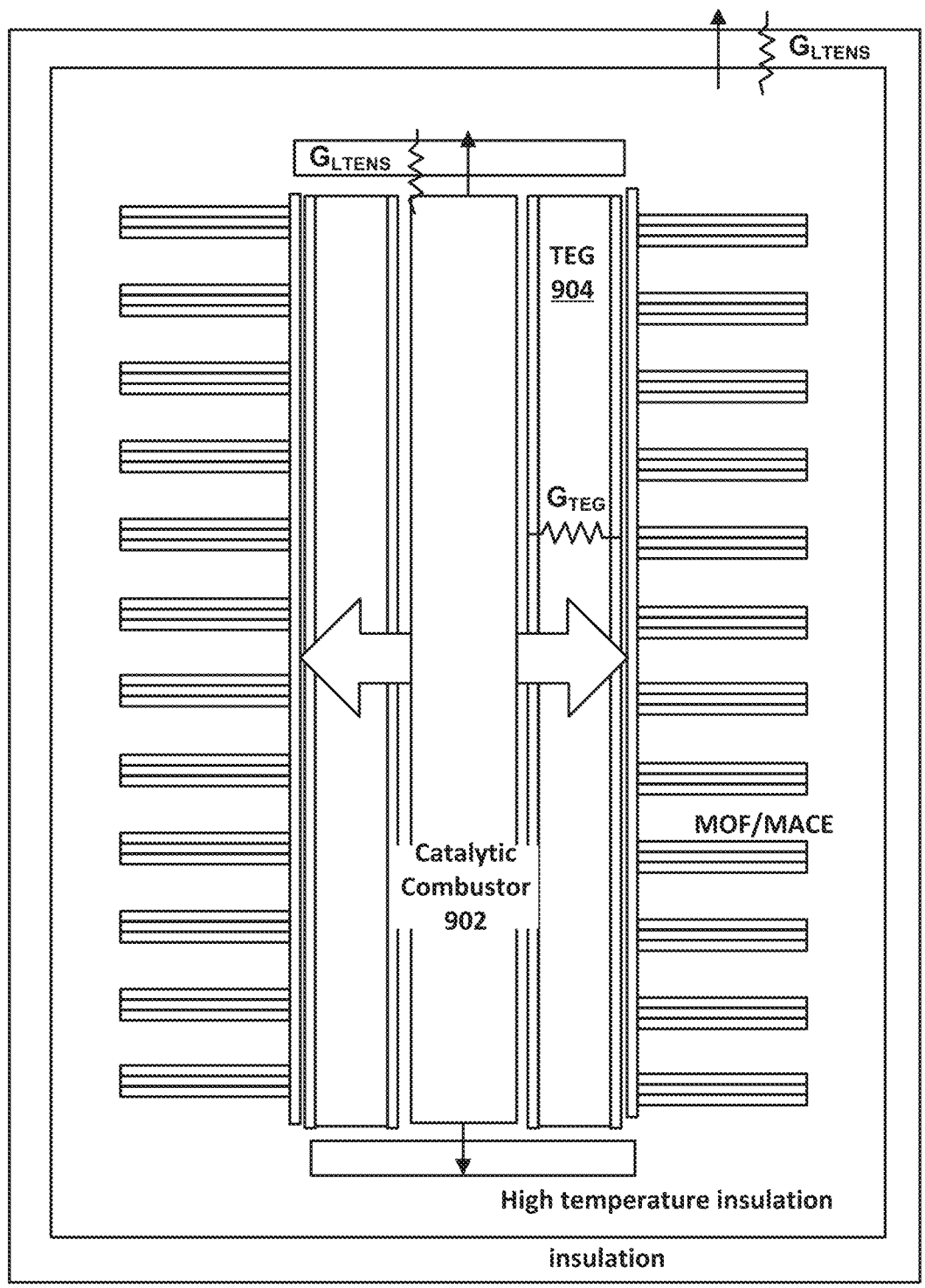
FIG. 9 shows a simplified schematic of a water sorption device.

A simplified thermal modeling analysis can confirm that energy loss targets are achievable. FIG. 9 shows a simplified schematic of a water sorption device, which may represent, for example, one of the two identical heat exchanger/MOF/catalytic combustor/TEG units in the desorption configuration, such as desorbing side 106 of FIG. 1. The TEG units are placed on each side of combustor 902. In the example of FIG. 9, TEG 904 represents an active TEG.

Any heat that flows out through the top and bottom, as opposed to through the TEG (left and right), is lost; thus achieving system energy specifications may require ~90% coupling efficiency. Additionally, any heat lost from the desorbing MOF area to the ambient environment is wasted.

Aspects of insulation will now be discussed. With correct geometric design, the insulation values necessary may be consistent with high-temperature compatibility Aerogel (0.00017 W/cm-K), and conventional polymer foam may be sufficient for the low-temperature packaging (0.00022 W/cm-K). However, given the challenging volumetric constraints of the system, and possible loses through interconnections and plumbing, additionally insulation may also be needed.

Systems 100 and 200 may utilize a vacuum insulated panel (VIP) fabrication and sealing process, which enables existing VIP designs to be scaled down and produced in arbitrary 3D form factors to adapt to complex geometries. A VIP works by evacuating and sealing a silicon powder and fiberglass substrate. Any gas-impermeable material can function as the encapsulant, such as aluminum-sputtered plastic. The edge seal necessitates a weak thermal link achieved by Parylene-coating the exposed substrate, and then finishing the seal with sputtered aluminum.

Prototype devices that have the expected thermal resistance and vacuum hold time have been built. This insulation technique can produce thermal conductivity values as low as 0.000035 W/cm-K. This technology may be implemented at various points in the system to converge on an optimal thermal design.

Aspects of packaging will now be discussed. The prismatic shapes chosen for the subcomponents can be packaged together in an efficient way. In some examples, depending on thermal design considerations and packaging considerations, a stacked cylindrical geometry may be desired. In either case, the outer packaging is formed with coated insulation. Sliding shutter valves are open on the adsorbing side and closed on the desorbing side. The sliding shutter valves may be Teflon coated on one side to form a reasonably good sliding seal that prevents hot, humid air from escaping on the desorbing side. Small servos or solenoids can be used for shutter actuation, as described in more detail below.

Aspects of a system condenser, such as condenser 110, will now be discussed. Condensing the water vapor at a desirably high rate requires a compact high-efficiency heat exchanger. The heat exchanger described above may be used for space-efficient mass and heat transport for the MOF bed. This same approach may be used for the condenser, leveraging the same intrinsic advantages detailed above.

As discussed above, a condenser temperature of ~65 C may be necessary to achieve condensation from a MOF bed heated to ~100 C. This implies a temperature delta to ambient of ~50 C at the 27 C ambient condition. Scaling from the results and using the approach described above, it is possible to construct a device which meets these requirements in a 50 cm$^3$ package, using 5 W of electrical power.

The cold plate of the condenser may need to be engineered to ensure that filmwise condensation is avoided, which can lead to significantly reduced heat transfer rates. In the filmwise regime, as water condenses onto a hydrophilic surface (e.g. clean copper) it forms a film of liquid water which acts as a thermal barrier, significantly reducing the overall heat transfer and therefore condensation rate, resulting in much larger surface area required for the condenser. To avoid filmwise condensation, two approaches may be considered: (1) dropwise condensation and (2) wicking condensation. Either approach, when properly implemented, can result in heat transfer rates 10-20 times greater than filmwise condensation.

For dropwise condensation, the basic principal is to coat the condenser with a hydrophobic layer that causes the condensing water to coalesce into droplets, maintaining a high fraction of exposed condenser surface area. As the droplets grow during condensation, the droplets eventually drip off the condenser surface, sustaining the high fraction of exposed condenser area and allowing the condensate to be collected. The hydrophobic layer may be composed of a thin coating of oil, or an inert layer such as Teflon or parylene. The primary challenge is to make the layer thin enough that it doesn't negatively impact heat transfer, while providing uniform coverage to drive coalescence of liquid droplets.

For wicking condensation, a porous structure is imposed onto the surface of the condenser, resulting in the condensed liquid being wicked and directed due to the high surface area. As the wick fills with liquid, it maintains a high fraction of exposed condenser surface area while directing the flow of the condensate to a collection channel. The primary challenge is fabricating the porous structure in such a way that provides the optimal combination of wicking and flowability.

The techniques of this disclosure may be used with either dropwise or wicking condensation methods to optimize the performance of the water condenser. The techniques of this disclosure also include implementing filtration methods (such as activated carbon and paper filters) to ensure potability of the captured water.

Aspects of a system compressor will now be discussed. The system of this disclosure may use a small compressor to provide the combined pressure and flow requirements of the combustor, adsorber, and condenser. Both small centrifugal blowers and diaphragm pumps may be capable of meeting the requirements.

Off the shelf small diaphragm pumps may generally have their peak efficiency operating points at somewhat higher pressures and lower flows than required to meet some of the water generation rates disclosed herein, such as >7.5 kg of water per day, whereas off the shelf blowers may have their peak efficiency point at lower pressures and higher flows. In one example system, the pressure and flow required may be approximately 70 slm at 1.9 psi, which corresponds to ~16 W of pneumatic power. As the TEG may generate ~25 W of electrical power (and electrical power consumption of the control system is <0.1 W), the compressor may need to be roughly 60% (16 W/25 W=~60%) efficient. This efficiency is achievable with either a diaphragm pump or a centrifugal blower.

For example, the Micronel U65M2-024KX-5 centrifugal blower operates at peak efficiency of over 50% at 0.87 psi and 210 slm, corresponding to 22 W of pneumatic power. To increase the pressure to meet requirements, a higher-efficiency brushless motor may be chosen to provide the exact torque/speed characteristics needed while improving efficiency. Modifying the housing geometry or 3D printing a custom impeller may also be considered. This blower has a volume of 0.10 L and a weight as low as 0.25 kg with a motor swap, both of which fit within the overall SWAP budget for the system.

Diaphragm pumps may also be used in the system. Both brushless DC motors and diaphragm pumps are capable of better than 90% efficiency, so it should be possible to achieve the required 60% efficiency with a diaphragm pump. For example, the KNF NMP830.1.2KPDC-B HP diaphragm pump achieves a peak efficiency of approximately 44% at 8.8 psi and 7.3 slm. The pneumatic power at this point is 6.78 W with input power of 15.6 W. The peak efficiency point of a pump such as this may be moved to a lower pressure by replacing the brushless DC motor with a motor that operates at peak efficiency at higher speed and lower torque than the installed motor. In this way, 60% efficiency at an operating point more near intended pressure characteristics can be reached. At that point, two pumps in parallel may be used to achieve the required flow. It is reasonable to assume that a single pump that meets the flow rate needed at a similar efficiency could also be used, whether with or without a motor change.

Aspects of system power and control will now be discussed. The system requires power conversion and system control to ensure optimal operation and minimize fuel use. The main challenges are achieving high electrical efficiency harvesting and conversion, and controlling the system harvesting paradigm as it switches each side back and forth between adsorption and desorption states. An embedded system with a small low power microcontroller may be used to control the water harvesting and power conversion.

Aspects of system power control will now be discussed. The power conversion portion of the system must simultaneously optimize TEG efficiency, boost the voltage to the required level, and charge a small LiPo battery for startup and transient power. The main challenge is doing all of this with very high efficiency to ensure electrical power is not wasted.

To minimize fuel use, the TEG may be controlled to operate at a maximum efficiency. For a given temperature, the voltage/current characteristic of the electrical load determines the power delivered. To maximize electrical power generation, the TEG must be electrically biased at the point where it delivers the maximum power for that given temperature. Fortunately, given the approximately constant slope of the current versus voltage plots, the peak power point is always about 50% of the open circuit voltage, making it easy to determine this peak power point at any time. This is called constant voltage maximum power point tracking (MPPT), and it is a widely used technique for energy harvesting applications such as solar cells. If the power conversion system controls the loading of the TEG output to be 50% of its open circuit voltage at any point in time, the output efficiency may be maximized. To do this, the power conversion circuit must periodically disconnect the TEG from the system, measure its voltage, and bias the TEG so that its output voltage is 50% of the measured open circuit voltage.

Figure 10:
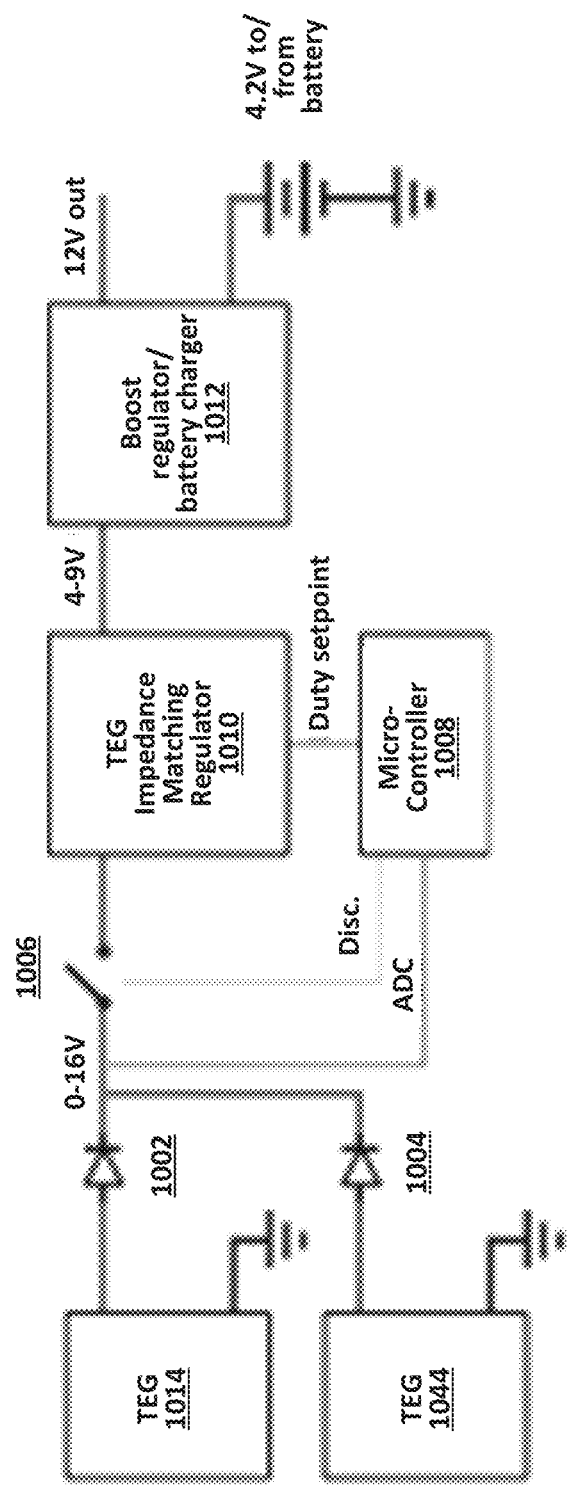
FIG. 10 shows an example of a power conversion system schematic.

FIG. 10 illustrates an example power design that may be used in systems 100 or 200. The outputs of TEGs 1014 and 1044 are connected via diodes 1002 and 1004, respectively, to ensure that the TEG on the adsorbing side (which is not producing power) does not consume power from the TEG on the desorbing side. Disconnect switch 1006 allows microcontroller 1008 to disconnect the TEGs from the rest of the system to measure the TEG open circuit voltage via an analog to digital converter (ADC). Then microcontroller 1008 reconnects the TEG to the circuit and changes the duty cycle of impedance matching switching voltage regulator 1010 draw enough current to pull the open circuit voltage down to 50% of the open circuit voltage. The maximum power point tracking algorithm may run continuously, checking the open circuit voltage periodically and biasing the TEG to the maximum power point automatically.

The maximum power point voltage may, for example, be between 4 and 9 V, and this is the voltage that is output from impedance matching regulator 1010. This voltage may be boosted, by boost regulator 1012, to a usable voltage such as 12 V to drive the compressor. This boost may be performed using a switching regulator similar to the impedance matching regulator, as shown in FIG. 10. The entire power conversion process from the TEG to the final 12 V output is projected to be at least 95% efficient.

The system may also use a small rechargeable (LiPo) battery to effectively start operation from a cold state and to maintain operation when disconnecting the load to measure the TEG open circuit voltage. The boost regulator circuit may boost the battery voltage to the required 12 V output during these conditions. This battery may be recharged with energy harvested from the TEG during operation, where any excess power produced by the TEG can go into the battery. The battery may be sized for the startup transient to provide power to the system to start the combustor. This would require running the compressor for a brief time (1-2 minutes) at approximately 5 W just to provide the fuel/air mix to the burner. A Li-ion battery the size of a AA battery is sufficient for this startup and any transients when the TEG is disconnected to check its open circuit voltage.

Aspects of a system control will now be discussed. An assortment of valves, motors, and sensors may be used to control the system water harvesting. A microcontroller may be used to monitor inputs from various sensors and drive outputs to the compressor, valves, and shutters in order to optimize water harvesting efficiency at all times. The microcontroller consumes substantially less power in steady state than the compressor.

Figure 11:
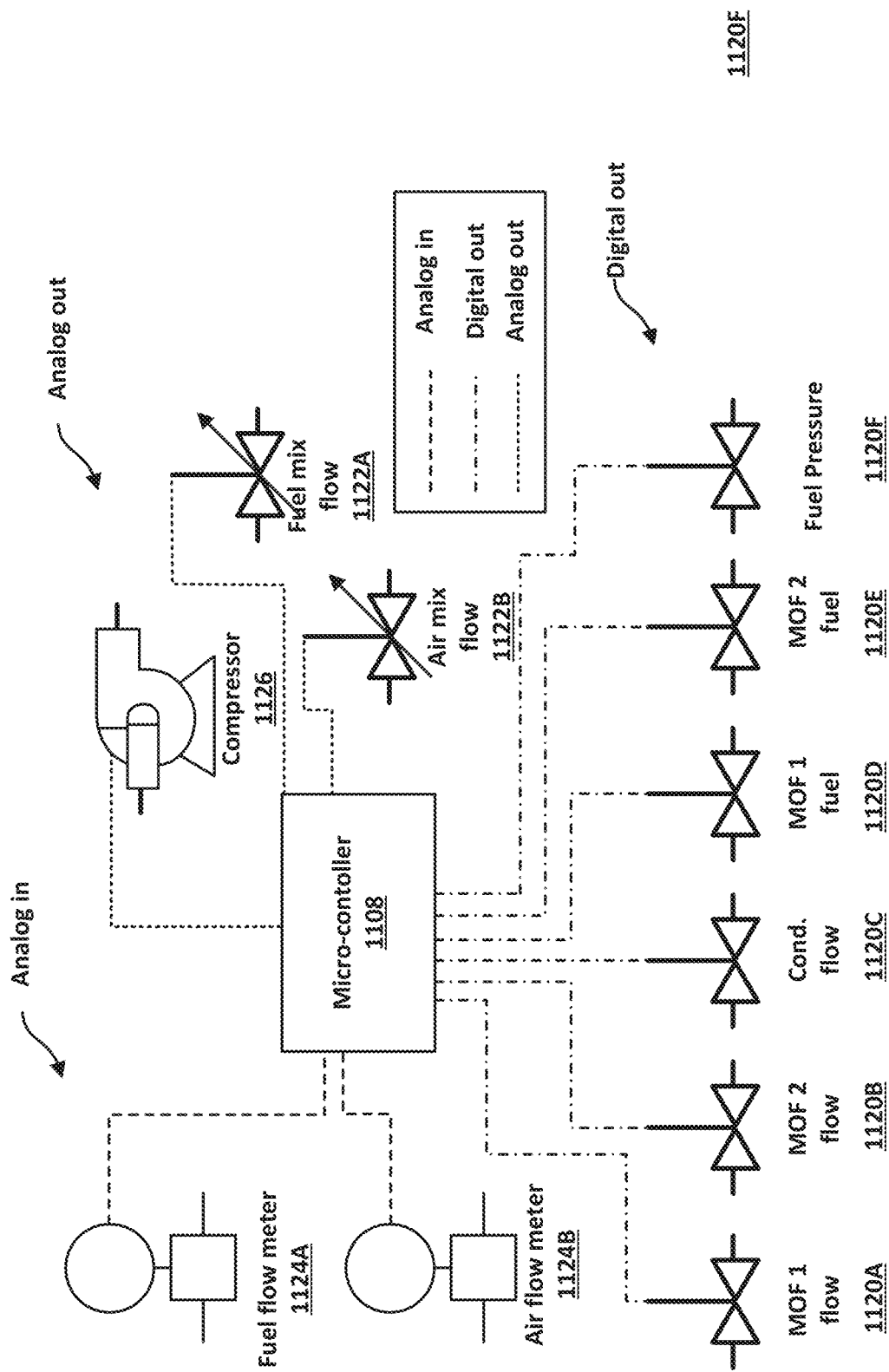
FIG. 11 shows an example of a pneumatic control schematic.

FIG. 11 shows an example of a pneumatic control schematic, for a pneumatic control system which may be included in systems 100 and/or 200. In the example of FIG. 11, microcontroller 1108 may be used to control a pneumatic system with the following components:

- 6 solenoid valves (1120A-1120F): 2 to turn flow through the MOF heat exchangers on and off, 1 to turn condenser flow off to place the unit in standby, 2 to turn the fuel/air mix to each catalytic combustor on and off, and one to control fuel tank head pressure. To reduce power consumption, magnetically latched solenoid valves with zero steady state power consumption may be used).
- 2 proportional valves (1122A and 1122B) to control the fuel air mix: 1 for the air (1122B) and 1 for the fuel (1122A). Valves with ~0 W steady state total power consumption may be used.
- 2 flow sensors to monitor the fuel (fuel flow meter 1124A) and air flows (air flow meter 1124B) to control the fuel air mix. The flow measurements may be useful during development but would likely not be needed in the final system. A flow sensors for this application may, for example, use 0.08 W steady state total power consumption.
- A single compressor 1126 to pump air through the two MOF heat exchangers, through the condenser heat exchanger and to pressurize the fuel, if necessary.

Figure 12:
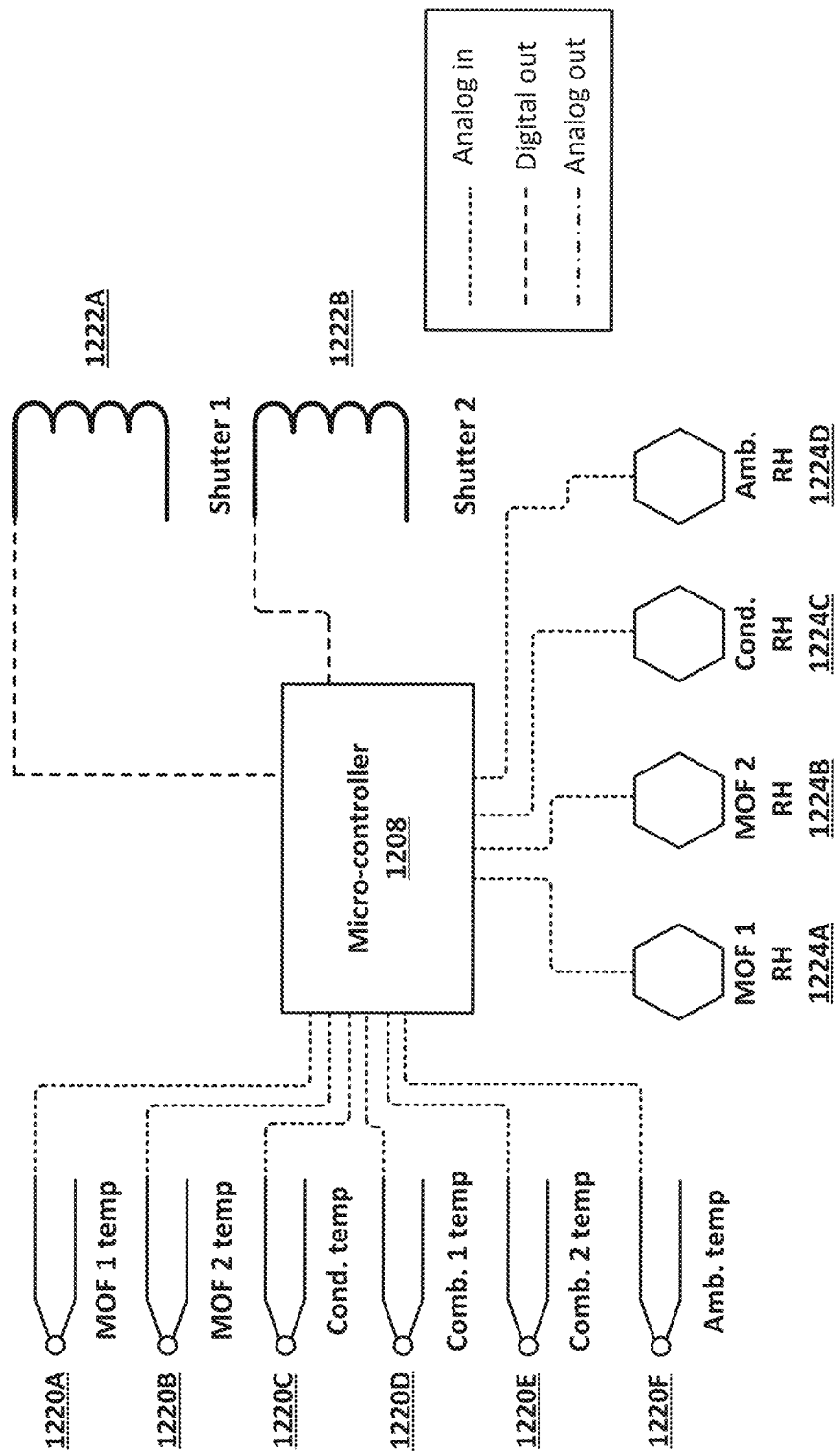
FIG. 12 shows an example of a temperature and humidity control schematic.

FIG. 12 shows an example of a temperature and humidity control schematic, for a temperature and humidity control system which may be included in systems 100 and/or 200. In the example of FIG. 12, the microcontroller 1208 may be used to monitor the humidity and temperature of various points in the system to drive control decisions to optimize the water harvesting:

- 6 temperature sensors (1220A-120F): 1 for each of the three heat exchangers, 1 for each of the two catalytic combustors, and 1 for ambient air temperature. Thermocouples and/or thermistors with ~0 W steady state power consumption may be used for temperature measurements.
- 2 solenoids (1222A and 1222B) to control the position of the high flow shutters to control airflow through the MOF during adsorption and desorption cycles. The high flow shutters may be magnetically latched to eliminate power consumption in steady state. (~0 W steady state total power consumption)
- 4 humidity sensors (1224A-1224D) to monitor RH in each MOF headspace, in the condenser headspace, and in the ambient to monitor the RH and determine when to switch the monitored space from adsorption to desorption. (~0 W steady state total power consumption)

The total power consumption of the control system should be less than 0.1 W in steady state, thus the majority (>99%) of the electrical power is used to drive the compressor.

Firmware in the microcontroller may control system operation. Temperature feedback from the combustor and flow measurements would be used to control the fuel/air proportional valves to achieve the required fuel stoichiometry and combustor temperature. The MOF and condenser temperature and humidity sensors would be used to determine when the desorption cycle is complete for one side (e.g. MOF 1) and would use this information to switch MOF 1 to adsorbing and MOF 2 to desorbing by opening shutter 1 and closing shutter 2, turning off the fuel to combustor 1 and turning it on to combustor 2, and turning the MOF 1 airflow on and the MOF 2 airflow off.

System 100 and system 200 represent examples of water extraction systems that include a hydrocarbon fuel tank; a first water sorption unit and a second water sorption unit that each include a catalytic combustor configured to, in a desorption state, combust a hydrocarbon fuel mixture to generate heat; a thermoelectric generator configured to, in the desorption state, generate electricity from a first portion of the heat from the catalytic combustor; an adsorber configured, in an adsorption state, to adsorb water from ambient air from an environment and in the desorption state, to desorb the adsorbed water as vapor using a second portion of the heat from the catalytic combustor; a condenser configured to condense vapor from the adsorber of each of the plurality of water sorption units; a pump configured to supply pressurized air to the plurality of water sorption units and the condenser using the electricity from the thermoelectric generator; and a controller configured to operate the first and second water sorption units in alternating and opposite adsorption and desorption states to extract the water from the environment.

Figure 13A:
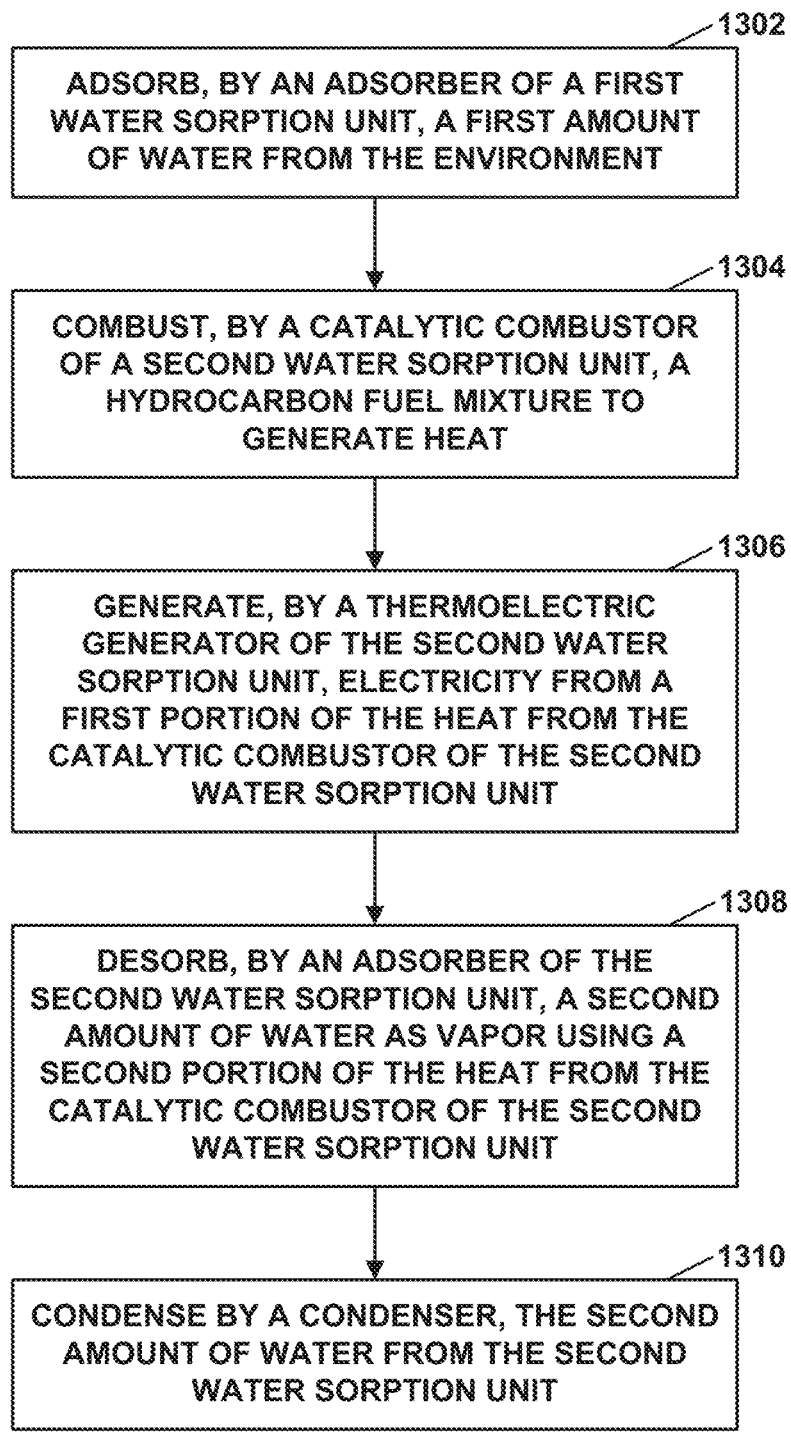
FIGS. 13A and 13B are flow diagrams illustrating a water extraction process according to the techniques of this disclosure.
Figure 13B:
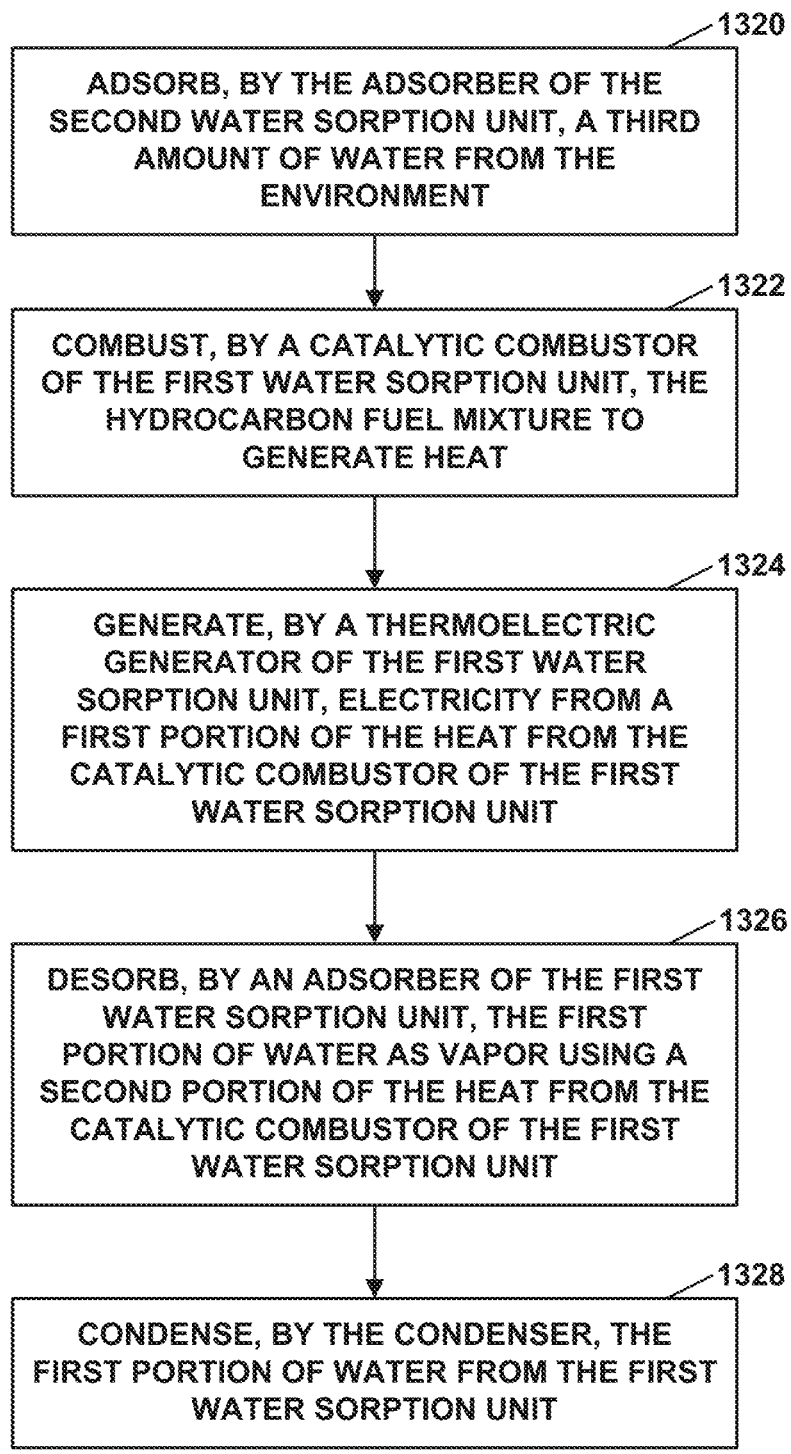

FIGS. 13A and 13B are flowcharts illustrating a process for performing AWE in accordance with the techniques of this disclosure. The techniques of FIGS. 13A and 13B will be described with respect to systems 100 of FIG. 1, although the techniques are not limited to only such a system. System 100 represents an example of a water extraction system configured to alternate between a first state and a second state. FIG. 13A shows the operation of system 100 in the first state, and FIG. 13B shows the operation of system 100 in the second state.

In the first state (shown in FIG. 13A), adsorber 118 adsorbs a first amount of water from the environment (1302). Catalytic combustor 142 combusts a hydrocarbon fuel mixture to generate heat (1304). TEG 144 generates electricity from a first portion of the heat from catalytic combustor 142 (1306). Adsorber 148 desorbs a second amount of water as vapor using a second portion of the heat from catalytic combustor 142 (1308). Condenser 110 condenses the second amount of water (1310).

In the second state (shown in FIG. 13B), adsorber 148 adsorbs a third amount of water from the environment (1320). Catalytic combustor 112 combusts the hydrocarbon fuel mixture to generate heat (1322). TEG 114 generates electricity from a first portion of the heat from catalytic combustor 112 (1324). Adsorber 118 desorbs the first amount of water as vapor using a second portion of the heat from catalytic combustor 112 (1326). Condenser 110 condenses the first amount of water (1328).

The following numbered examples illustrate one or more aspects of the devices and techniques described in this disclosure.

Example 1. A water extraction system, comprising: a hydrocarbon fuel tank; a first water sorption unit and a second water sorption unit, wherein each of the first and second water sorption units comprises: a catalytic combustor configured to, in a desorption state, combust a hydrocarbon fuel mixture to generate heat; a thermoelectric generator configured to, in the desorption state, generate electricity from a first portion of the heat from the catalytic combustor; an adsorber configured to: in an adsorption state, adsorb water from ambient air from an environment; and in the desorption state, desorb the adsorbed water as vapor using a second portion of the heat from the catalytic combustor; a condenser configured to condense vapor from the adsorber of each of the plurality of water sorption units; a pump configured to supply pressurized air to the plurality of water sorption units and the condenser using the electricity from the thermoelectric generator; and a controller configured to operate the first and second water sorption units in alternating and opposite adsorption and desorption states to extract the water from the environment.

Example 2. The water extraction system of example 1, wherein each adsorber comprises fins that include a plurality of channels, and wherein each of the plurality of channels is configured to, in the adsorption state, receive pressurized air from the pump and discharge the pressurized air from a surface of a respective fin.

Example 3. The water extraction system of example 2, wherein each adsorber comprises a metal organic framework (MOF) material that includes micropores.

Example 4. The water extraction system of example 3, wherein the MOF material comprises a coating on the surface of the fins, and wherein the plurality of channels is configured to discharge the pressurized air from the micropores of the MOF material.

Example 5. The water extraction system of any of examples 1-4, further comprising a mixing element configured to: receive hydrocarbon fuel from the hydrocarbon fuel tank and pressurized air from the pump; and generate the hydrocarbon fuel mixture from the hydrocarbon fuel and the pressurized air.

Example 6. The water extraction system of any of examples 1-5, wherein the condenser comprises fins that include a plurality of channels, and wherein each of the plurality of channels is configured to receive pressurized air from the pump and discharge the pressurized air from a surface of a respective fin.

Example 7. The water extraction system of any of examples 1-6, wherein the controller is powered by the electricity from the thermoelectric generator.

Example 8. The water extraction system of any of examples 1-7, wherein a ratio of the first portion of the heat from the catalytic combustor and the second portion of the heat from the catalytic combustor is between about 5:95 and about 15:85.

Example 9. The water extraction system of any of examples 1-8, further comprising a housing encasing each of the first and second water sorption units, wherein the housing comprises slats configured to, in the adsorption state, permit ambient air to enter the adsorber of the respective first or second water sorption unit and block ambient air from entering the adsorber of the other respective first or second water sorption unit.

Example 10. A method for extracting water, comprising: alternatingly operating a water extraction system between a first state and a second state, wherein the first state comprises: adsorbing, by an adsorber of a first water sorption unit, a first amount of water from the environment; combusting, by a catalytic combustor of a second water sorption unit, a hydrocarbon fuel mixture to generate heat; generating, by a thermoelectric generator of the second water sorption unit, electricity from a first portion of the heat from the catalytic combustor of the second water sorption unit; desorbing, by an adsorber of the second water sorption unit, a second amount of water as vapor using a second portion of the heat from the catalytic combustor of the second water sorption unit; and condensing, by a condenser, the second amount of water from the second water sorption unit; and wherein the second state comprises: adsorbing, by the adsorber of the second water sorption unit, a third amount of water from the environment; combusting, by a catalytic combustor of the first water sorption unit, the hydrocarbon fuel mixture to generate heat; generating, by a thermoelectric generator of the first water sorption unit, electricity from a first portion of the heat from the catalytic combustor of the first water sorption unit; desorbing, by an adsorber of the first water sorption unit, the first amount of water as vapor using a second portion of the heat from the catalytic combustor of the first water sorption unit; and condensing, by the condenser, the first amount of water from the first water sorption unit.

Example 11. The method of example 10, wherein each adsorber comprises fins that include a plurality of channels, and wherein the method further comprises, by each of the plurality of channels in the adsorption state: receiving pressurized air from the pump; and discharging the pressurized air from a surface of a respective fin.

Example 12. The method of example 11, wherein the adsorber comprises a metal organic framework (MOF) material that includes micropores, wherein the MOF material comprises a coating on the surface of the fins, and wherein the method further comprises, by each of the plurality of channels, discharging the pressurized air from the micropores of the MOF material.

Example 13. The method of any of examples 10-12, further comprising: receiving, by a mixing element, hydrocarbon fuel from the hydrocarbon fuel tank and pressurized air from the pump; and generating, by the mixing element, the hydrocarbon fuel mixture from the hydrocarbon fuel and the pressurized air.

Example 14. The method any of examples 10-13, further comprising powering the controller with the electricity from the thermoelectric generator.

Example 15. The method any of examples 10-14, wherein a ratio of the first portion of the heat from the catalytic combustor and the second portion of the heat from the catalytic combustor is between about 5:95 and about 15:85.

Example 16. A water sorption device, comprising: a catalytic combustor configured to, in a desorption state, combust a hydrocarbon fuel mixture to generate heat; a thermoelectric generator configured to, in the desorption state, generate electricity from a first portion of the heat from the catalytic combustor; and an adsorber configured to: in an adsorption state, adsorb water from ambient air from an environment; and in the desorption state, desorb the adsorbed water as vapor using a second portion of the heat from the catalytic combustor.

Example 17. The water sorption device of example 16, wherein the adsorber comprises fins that include a plurality of channels, and wherein each of the plurality of channels is configured to, in the adsorption state, receive pressurized air from a pressurized air source and discharge the pressurized air from a surface of a respective fin.

Example 18. The water sorption device of example 17, wherein the adsorber comprises a metal organic framework (MOF) material that includes micropores.

Example 19. The water sorption device of example 18, wherein the MOF material comprises a coating on the surface of the fins, and wherein the plurality of channels is configured to discharge the pressurized air through the micropores of the MOF material.

Example 20. The water sorption device of any of examples 16-19, further comprising a housing encasing the adsorber, wherein the housing comprises slats configured to: in the adsorption state, permit ambient air to enter the adsorber; and in the desorption state, block ambient air from entering the adsorber.

Various examples have been described. These and other examples are within the scope of the following claims.

What is claimed is:

1. A water extraction system, comprising:
   a hydrocarbon fuel tank;
   a first water sorption unit and a second water sorption unit, wherein each of the first and second water sorption units comprises:
   a catalytic combustor configured to, in a desorption state, combust a hydrocarbon fuel mixture to generate heat;
   a thermoelectric generator configured to, in the desorption state, generate electricity from a first portion of the heat from the catalytic combustor;
   an adsorber configured to:
   in an adsorption state, adsorb water from ambient air from an environment; and
   in the desorption state, desorb the adsorbed water as vapor using a second portion of the heat from the catalytic combustor;
   one or more condensers configured to condense vapor from the adsorber of each of the plurality of water sorption units;
   a pump configured to supply pressurized air to the plurality of water sorption units and the one or more condensers using the electricity from the thermoelectric generator; and
   a controller configured to operate the first and second water sorption units in alternating and opposite adsorption and desorption states to extract the water from the environment.

2. The water extraction system of claim 1,
   wherein each adsorber comprises fins that include a plurality of channels, and
   wherein each of the plurality of channels is configured to, in the adsorption state, receive pressurized air from the pump and discharge the pressurized air from a surface of a respective fin.

3. The water extraction system of claim 2, wherein each adsorber comprises a metal organic framework (MOF) material that includes micropores.

4. The water extraction system of claim 3,
   wherein the MOF material comprises a coating on the surface of the fins, and
   wherein the plurality of channels is configured to discharge the pressurized air from the micropores of the MOF material.

5. The water extraction system of claim 1, further comprising a mixing element configured to:
   receive hydrocarbon fuel from the hydrocarbon fuel tank and pressurized air from the pump; and
   generate the hydrocarbon fuel mixture from the hydrocarbon fuel and the pressurized air.

6. The water extraction system of claim 1,
   wherein the one or more condensers comprises fins that include a plurality of channels, and
   wherein each of the plurality of channels is configured to receive pressurized air from the pump and discharge the pressurized air from a surface of a respective fin.

7. The water extraction system of claim 1, wherein the controller is powered by the electricity from the thermoelectric generator.

8. The water extraction system of claim 1, wherein a ratio of the first portion of the heat from one of the catalytic combustors and the second portion of the heat from one of the catalytic combustors is between about 5:95 and about 15:85.

9. The water extraction system of claim 1, further comprising a housing encasing each of the first and second water sorption units, wherein the housing comprises slats configured to, in the adsorption state, permit ambient air to enter the adsorber of the respective first or second water sorption unit and block ambient air from entering the adsorber of the other respective first or second water sorption unit.

10. A method for extracting water, comprising:
    alternatingly operating a water extraction system between a first state and a second state,
    wherein the first state comprises:
    adsorbing, by an adsorber of a first water sorption unit, a first amount of water from the environment;
    combusting, by a catalytic combustor of a second water sorption unit, a hydrocarbon fuel mixture to generate heat;
    generating, by a thermoelectric generator of the second water sorption unit, electricity from a first portion of the heat from the catalytic combustor of the second water sorption unit;
    desorbing, by an adsorber of the second water sorption unit, a second amount of water as vapor using a second portion of the heat from the catalytic combustor of the second water sorption unit; and
    condensing, by a condenser, the second amount of water from the second water sorption unit; and
    wherein the second state comprises:
    adsorbing, by the adsorber of the second water sorption unit, a third amount of water from the environment;
    combusting, by a catalytic combustor of the first water sorption unit, the hydrocarbon fuel mixture to generate heat;
    generating, by a thermoelectric generator of the first water sorption unit, electricity from a first portion of the heat from the catalytic combustor of the first water sorption unit;
    desorbing, by an adsorber of the first water sorption unit, the first amount of water as vapor using a second portion of the heat from the catalytic combustor of the first water sorption unit; and
    condensing, by the condenser, the first amount of water from the first water sorption unit.

11. The method of claim 10,
    wherein each adsorber comprises fins that include a plurality of channels, and
    wherein the method further comprises, by each of the plurality of channels in the adsorption state:
    receiving pressurized air from a pump; and
    discharging the pressurized air from a surface of a respective fin.

12. The method of claim 11,
    wherein each adsorber comprises a metal organic framework (MOF) material that includes micropores,
    wherein the MOF material comprises a coating on the surface of the fins, and
    wherein the method further comprises, by each of the plurality of channels, discharging the pressurized air from the micropores of the MOF material.

13. The method of claim 10, further comprising:
    receiving, by a mixing element, hydrocarbon fuel from the hydrocarbon fuel tank and pressurized air from a pump; and
    generating, by the mixing element, the hydrocarbon fuel mixture from the hydrocarbon fuel and the pressurized air.

14. The method of claim 10 further comprising powering a controller with the electricity from the thermoelectric generators.

15. The method of claim 10, wherein a ratio of the first portion of the heat from one of the catalytic combustors and the second portion of the heat from one of the catalytic combustors is between about 5:95 and about 15:85.

16. A water sorption device, comprising:
a catalytic combustor configured to, in a desorption state, combust a hydrocarbon fuel mixture to generate heat;
a thermoelectric generator configured to, in the desorption state, generate electricity from a first portion of the heat from the catalytic combustor; and
an adsorber configured to:
in an adsorption state, adsorb water from ambient air from an environment; and
in the desorption state, desorb the adsorbed water as vapor using a second portion of the heat from the catalytic combustor.

17. The water sorption device of claim 16,
wherein the adsorber comprises fins that include a plurality of channels, and
wherein each of the plurality of channels is configured to, in the adsorption state, receive pressurized air from a pressurized air source and discharge the pressurized air from a surface of a respective fin.

18. The water sorption device of claim 17, wherein the adsorber comprises a metal organic framework (MOF) material that includes micropores.

19. The water sorption device of claim 18,
wherein the MOF material comprises a coating on the surface of the fins, and
wherein the plurality of channels is configured to discharge the pressurized air through the micropores of the MOF material.

20. The water sorption device of claim 16, further comprising a housing encasing the adsorber, wherein the housing comprises slats configured to:
in the adsorption state, permit ambient air to enter the adsorber; and
in the desorption state, block ambient air from entering the adsorber.

* * * * *